United States Patent
Tarkhanyan et al.

(10) Patent No.: US 12,244,601 B2
(45) Date of Patent: Mar. 4, 2025

(54) TRUSTED AND CONNECTED MULTI-DOMAIN NODE CLUSTERS

(71) Applicant: Intel Corporation, Santa Clara, CA (US)

(72) Inventors: Anahit Tarkhanyan, Cupertino, CA (US); Reshma Lal, Portland, OR (US); Jianping Xu, Portland, OR (US); Christine E. Severns-Williams, Deephaven, MN (US)

(73) Assignee: Intel Corporation, Santa Clara, CA (US)

( * ) Notice: Subject to any disclaimer, the term of this patent is extended or adjusted under 35 U.S.C. 154(b) by 446 days.

(21) Appl. No.: 17/541,155

(22) Filed: Dec. 2, 2021

(65) Prior Publication Data
US 2022/0094690 A1 Mar. 24, 2022

(51) Int. Cl.
*H04L 9/40* (2022.01)
*G06F 9/50* (2006.01)

(52) U.S. Cl.
CPC ............ *H04L 63/104* (2013.01); *G06F 9/505* (2013.01); *H04L 63/0435* (2013.01); *H04L 63/20* (2013.01)

(58) Field of Classification Search
CPC ... H04L 63/104; H04L 63/0435; H04L 63/20; G06F 9/505
USPC .......................................................... 726/4
See application file for complete search history.

(56) References Cited

U.S. PATENT DOCUMENTS 10,778,597 B1 * 9/2020 Tan .......................... H04L 67/02
11,637,868 B2 * 4/2023 Scarlata .................. H04L 63/20
726/1
2015/0379423 A1 * 12/2015 Dirac ....................... G06N 20/00
706/12
2019/0034237 A1 * 1/2019 Siddappa ............. H04L 67/1012
2021/0021619 A1 * 1/2021 Smith ..................... H04L 63/20
2021/0266161 A1 * 8/2021 Zee ........................ H04L 9/0891

(Continued)

FOREIGN PATENT DOCUMENTS

CN 114697190 A * 7/2022 ......... G06F 9/45558

OTHER PUBLICATIONS

Dujodwala, Securing Cloud from DDOS Attacks Using Intrusion Detection System in Virtual Machine, Mar. 25, 2010 (Year: 2010).*

(Continued)

*Primary Examiner* — Shin-Hon (Eric) Chen
*Assistant Examiner* — Saad Ahmad Abdullah
(74) *Attorney, Agent, or Firm* — Alliance IP, LLC

(57) ABSTRACT

A system includes an orchestrator to receive a first request for resources for a workload of a tenant and to select a first node cluster in a first compute domain to be provisioned for the workload. The system also includes a first security manager to run in a trusted execution environment of one or more processors to receive attestation results for a second node cluster from a second security manager in a second compute domain, and to establish the first node cluster and the second node cluster as a trusted group of node clusters for the workload based, at least in part, on determining that a first compute node in the first node cluster meets one or more security requirements of a workload execution policy associated with the workload and that the attestation results indicate that a second compute node in the second node cluster meets the one or more security requirements.

25 Claims, 12 Drawing Sheets

(56) References Cited

U.S. PATENT DOCUMENTS

2021/0336994 A1 10/2021 Scarlata et al.
2022/0141201 A1 5/2022 Lal et al.

OTHER PUBLICATIONS

"Creating Trust in the Cloud," Intel.com, copyright 2013, retrieved from https://www.intel.com/content/dam/develop/external/us/en/documents/creating-trust-in-the-cloud-ubuntu-intel-white-paper.pdf, 5 pages.
"Data Processing Unit," Wikipedia, Nov. 30, 2021, retrieved from https://en.wikipedia.org/w/index.php?title=Data_processing_unit&oldid=1057879017, 3 pages.
"Trusted Cloud computing with Intel TXT: The challenge," Apr. 16, 2014, retrieved from https://www.mirantis.com/blog/trusted-cloud-intel-txt-security-compliance/, 9 pages.
Deierling, Kevin, "What is a DPU?" Nvidia, May 20, 2020, retrieved from https://blogs.nvidia.com/log/2020/05/20/whats-a-dpu-data-processing-unit/, 7 pages.
Intel Newsroom, "Intel Unveils Infrastructure Processing Unit," Jun. 14, 2021, retrieved from https://www.intel.com/content/www/us/en/newsroom/news/infrastructure-processing-unit-data-center.html#gs.emOwsx, 7 pages.

* cited by examiner

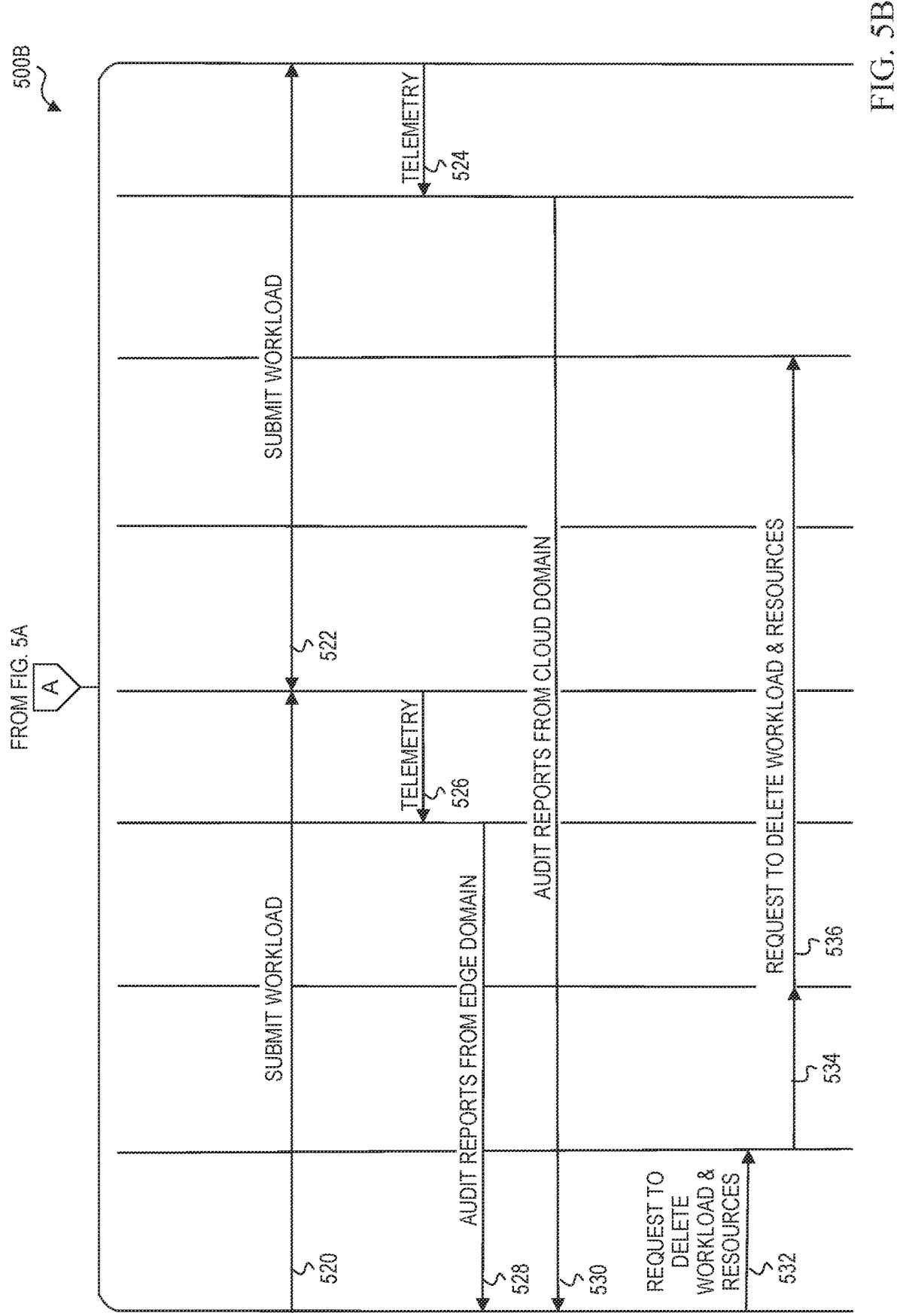

TRUSTED AND CONNECTED MULTI-DOMAIN NODE CLUSTERS

TECHNICAL FIELD

The present disclosure relates in general to the field of computers, and more specifically, to trusted and connected multi-domain node clusters.

BACKGROUND

Application workloads are no longer fixed to cloud or cloud compute environments. Instead, a workload can migrate dynamically from a cloud to an edge, and from the edge to the cloud. An example of this can be shown by artificial intelligence (AI)/machine learning (ML) processing, where both inferencing and training functions can be performed at any execution locality across the edge and cloud. Traditionally isolated cloud and edge compute environments have now become part of an elastic and disaggregated execution environment consisting of heterogenous compute elements such as central processing units (CPUs), graphics processing units (GPUs), field programmable gate arrays (FPGAs), and specialized hardware accelerators in cloud and edge. CSPs (Cloud Service Providers), which have typically focused on maintaining solutions in cloud compute environments, are extending their compute boundary to include edge compute environments. This extension can help scale execution, meet QoS needs, and meet regulatory requirements, including data sovereignty and data privacy needs. At the same time, traditionally closed Internet of Things (IOT) environments are starting to extend their computation from edge to cloud environments to meet compute scaling needs that cannot be satisfied by the available resources at the edge.

BRIEF DESCRIPTION OF THE DRAWINGS

FIGS. 5A-5B illustrate flow diagrams of interactions in a multi-domain environment to provide a trusted group of node clusters according to an embodiment.

Like reference numbers and designations in the various drawings indicate like elements.

DETAILED DESCRIPTION

Figure 1:
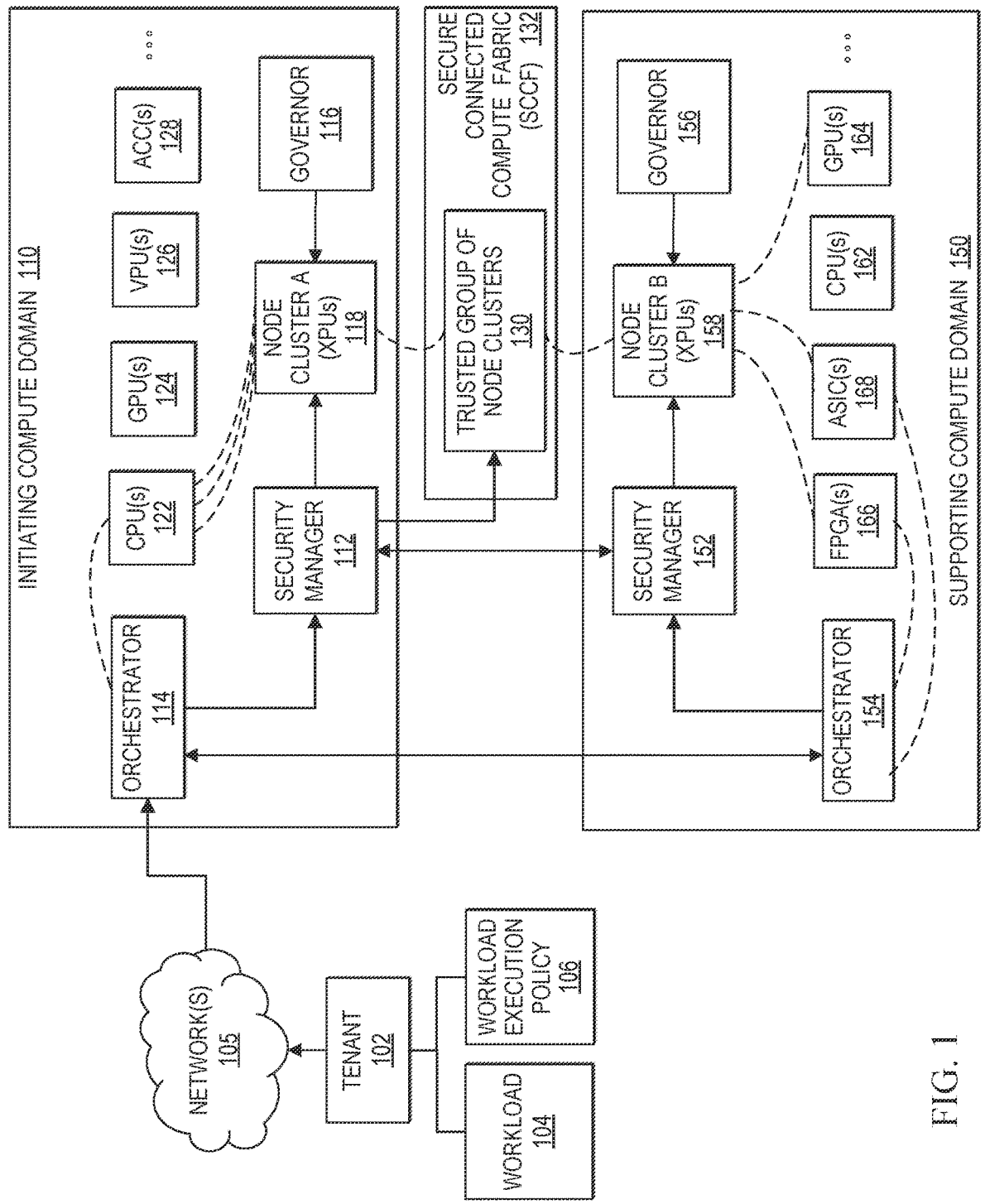
FIG. 1 is a block diagram illustrating an example multi-domain environment with computing systems to provide a trusted group of node clusters according to an embodiment.

The present disclosure provides various possible embodiments, or examples, of systems, methods, apparatuses, architectures, and machine readable media for dynamically establishing a trusted and connected group of node clusters in a multi-domain environment to host a workload. In particular, embodiments disclosed herein enable trusted and coherent execution across dynamic domain boundaries for workload execution. The domains can include edge infrastructure(s), cloud infrastructure(s), other compute infrastructure(s), or any suitable combination thereof. The cloud and edge infrastructures can include compute nodes, storage nodes, network nodes, memory nodes, and any other types of nodes that provide compute, storage, and/or networking capabilities. Compute nodes may include processing devices such as CPUs, GPUs, VPUs, FPGAs, special purpose application-specific integrated circuit (ASIC), and various types of hardware accelerators. Such compute nodes may generally be referred to herein as "XPUs."

In a dynamic compute environment, embodiments disclosed herein can bring both cloud and edge XPU elements (and other elements) together in a coherent execution fabric to create disaggregated compute environment. Embodiments may include a policy-based method of establishing a trusted group of node clusters in a multi-domain environment. A trusted group of node clusters involved in a workload execution includes one or more compute nodes in one or more node clusters. Other elements such as storage nodes, memory nodes, and network nodes may also be included in the node clusters of the trusted group. The trusted group involved in a workload execution in a multi-domain environment may be described as a secure connected compute fabric.

Security sensitive workloads that run in a disaggregated compute environment spanning domains, such as a cloud infrastructure and an edge infrastructure, need protection from potential hardware and software threats that could compromise confidentiality or integrity of their workloads. Owners of the workloads want assurance that protection is provided to the workloads. Trusted execution environments (also referred to herein as "TEES") on a platform can provide such assurances using hardware-based technologies, such as Software Guard Extensions (SGX) technology by Intel Corp., technology under the name or trademark of TrustZone by ARM, Ltd., technology under the name or trademark of SEV by Advanced Micro Devices, Inc. In addition, some mechanisms propose pooling, such as trusted execution environments in cloud infrastructures for scaling execution of large security sensitive workloads across the cloud.

Today's solutions do not address the security needs of computations that span cloud and edge compute boundaries. For example, while a cloud service provider (CSP) controls security of the cloud infrastructure, the CSP has less control of security at an interconnected edge infrastructure since the edge infrastructure may be deployed by different owners and can include hardware, firmware, and software stacks that are not selected or deployed under the control of the CSP. Also, a CSP lacks control of the physical protection of edge devices. Consequently, physical threats may be a significant concern. Likewise, an edge platform owner may have little to no control of security of the compute environment in the cloud infrastructure.

Static attestation of a compute environment, where a tenant verifies attestation of one or more XPUs before sending a workload to run on those XPUs, may not accommodate the dynamic nature of a workload compute environment that could potentially span multiple domains. With static attestation, the chain of trust may be established with a platform to ensure confidentiality and integrity of a workload running on the XPUs in the platform is maintained. This established chain of trust, however, does not necessarily extend to other domains. Thus, the dynamic aspect workload execution or cooperative execution in multi-domain environments may render such executions vulnerable to hardware, firmware, and/or software threats.

Some workloads could benefit significantly from interconnected computation across multiple domains. Furthermore, the compute boundaries of some workloads may need to be dynamically modified during its execution to obtain and use resources in different domains. For example, an autonomous car may have a workload including some real-time processing that needs to be performed at a proximate edge infrastructure (e.g., decisions dependent on camera sensor data of surrounding area and speed sensor data), while other workload processing may tolerate some latency and can be performed in a remote cloud infrastructure. As the autonomous car moves, the real-time processing may need to migrate to other edge infrastructures to maintain proximity to the moving vehicle, while the cloud processing may remain in the same cloud but redirect communications to the new edge infrastructure of the workload. Accordingly, the dynamic nature of the workload compute environment should be considered when assigning resources (e.g., XPUs). To ensure the integrity and confidentiality of such workloads, a dynamic compute boundary should meet trusted execution requirements and tenants (also referred to herein as 'workload owners') should be able to obtain an assurance for trustworthiness of the distributed and disaggregated compute fabric.

A system for dynamically establishing a trusted and connected group of node clusters in a multi-domain environment can solve these issues (and more). Embodiments of the system disclosed herein include a dynamic discovery and attestation scheme that can be performed without disrupting a workload execution. In the scheme, a tenant can provide a workload execution policy to a selected compute domain (e.g., an edge infrastructure or a cloud infrastructure), which can become the initiating compute domain (e.g., an edge infrastructure). The workload execution policy can include a security policy and indicate the resources that are needed for the workload. The initiating compute domain can select and attest a first node cluster (also referred to herein as 'trusted zone of execution') comprising one or more compute resources (e.g., CPUs, GPUs, FPGAs, accelerators, etc.) indicated in the workload execution policy. The initiating compute domain can send a request to another domain, which can become a supporting compute domain (e.g., a cloud infrastructure), to request other resources that may be indicated in the workload execution policy, but are not provided by the initiating compute domain. The supporting compute domain can select and attest a second node cluster comprising one or more compute resources and provide this information to the initiating compute domain. The initiating compute domain can establish a trusted group of node clusters (e.g., first node cluster and second node cluster) to provide computation for the workload. The initiating compute domain can provide an attestation report of the success or failure of individual attestation results for each node or collective attestation results for each node cluster in the trusted group of node clusters to the tenant. The initiating compute domain can also generate a shared secret key(s) and provide it to the tenant to enable the tenant to communicate with the node clusters in the trusted group of node clusters.

A dynamic compute multi-domain fabric established in accordance with one or more embodiments, can include heterogenous compute elements (or homogenous compute elements if called for) that meet ecosystem needs of secure compliance execution, such as a tenant's requirements and/or regulatory requirements. Tenants can extend execution boundaries and dynamically assign compute resources to different domains (e.g., edge to cloud) to meet performance, latency, and regulatory requirements. A cloud-side XPU architectural model can be expanded to an edge infrastructure to leverage the resources at the edge and enable seamless transition of workloads to the edge-located resources. Thus, embodiments disclosed herein can provide a flexible and novel coherent execution fabric.

Turning to the FIGURES, FIG. 1 shows an example multi-domain environment 100 providing a trusted group of node clusters according to an embodiment. FIG. 1 illustrates an initiating compute domain 110 and a supporting compute domain 150, each of which may include any suitable environment that provides support for workloads of a tenant 102. For example, initiating compute domain 110 and supporting compute domain 150 may embody the same type or different types of infrastructure, such as an edge infrastructure or a cloud infrastructure. The platforms of initiating compute domain 110 and supporting compute domain 150 may include multiple compute nodes (XPUs), which may include various types of processing devices including, but not necessarily limited to, central processing units (CPUs) 122, 162, graphics processing units (GPUs) 124, 164, vision processing units (VPUs) 126, various types of accelerators (ACCs) 128, field programmable gate arrays (FPGAs) 166, application-specific integrated circuits (ASICs) 168, and any other type of processing device (e.g., infrastructure processing units (IPUs), etc.). Any number of different hardware vendors, specifications, properties, etc. may be provided by the XPUs in the platforms. In at least some scenarios, the platforms may also include other types of nodes used by workloads, such as storage nodes, memory nodes, network nodes, etc.

In one or more embodiments, each compute domain 110 and 150 also includes an orchestrator 114, 154 and security manager 112, 152, which cooperate to assign resources for a workload, attest the assigned resources, and establish a trusted group of node clusters (or zones) based on the assigned and attested resources. Generally, orchestration such as resource allocation for a workload execution is performed by orchestrators 114 and 154 in respective compute domains 110 and 150, while trust establishment for the workload execution is performed by security managers 112 and 152. Additionally, secure monitor and reporting may be performed by respective governors 116 and 156 of compute domains 110 and 150. In some examples, one or more of the orchestrators, security managers, and governors may be implemented externally to, but operably and communicatively coupled to, their respective compute domains. In other examples, an orchestrator, a security manager, and a governor, or any combination thereof, may be integrated in a single module and executed on one or more computing systems.

Multiple different workload owners may cause tenant 102 (or other tenants) to connect to initiating compute domain 110 (e.g., an edge or cloud infrastructure) to obtain processing support for their workloads. Some workloads may require significant computation support, for example, processes involving artificial intelligence and machine learning. Some workloads may have various requirements for node clusters assigned to process the workload. For example, a given workload may require particular processing devices, performance criteria, security attributes, privacy attributes, regulatory requirements, and other parameters, or any combination thereof.

As shown in FIG. 1, a tenant 102 is provided with a workload 104 and a workload execution policy 106 to be applied to the workload 104. A workload may include applications, services, microservices, containers, and/or virtual machines, for example. In some embodiments, a workload may be provided by a tenant for execution in response to the tenant requesting workload resources from a compute domain and the compute domain (with one or more other compute domains) provisioning those resources according to the WEP.

In this example, tenant 102 may be a computing device or system that connects to initiating compute domain 110 via one or more networks 105 and that is configured to communicate requests for workload resources to compute domains. In other scenarios, tenant 102 may be integrated with initiating compute domain 110. Tenant 102 may be under the control of a workload owner (or multiple workload owners) that owns workload 104 and data associated with the workload processing. Generally, workload owners are interested in running workloads efficiently by combining available resources across domains, such as cloud and edge infrastructures, while still meeting their security, latency, availability, and resiliency requirements or goals. A tenant and the workload owner typically do not have visibility into which specific resources can be assigned for a workload execution and also does not have the ability to verify that the selected resources (e.g., XPUs) meet their security requirements.

Tenant 102 and/or the workload owner may have several responsibilities when requesting compute resources for a workload. First, tenant 102 and/or the workload owner creates a security policy that gates the admission of a compute node or node cluster to the tenant's trusted group of node clusters. Alternatively, tenant 102 and/or the workload owner may choose such a policy from a list of available policies, for example, from the initiating compute domain 110. The security policy may represent the entire workload execution policy 106 or may be combined with numerous other policies (e.g., performance criteria, privacy attributes, hardware properties, regulatory requirements, etc.) in the workload execution policy 106. Tenant 102 and/or the workload owner may also evaluate an audit report of their workload execution at any time (e.g., during execution on upon execution completion) to assess if the trusted group of node clusters is complying with the security requirements of the security policy. An audit report can cover, but is not necessarily limited to, workload execution geolocation and/or an execution profile that will specify the resource consumption, performance, latency, etc.

In at least one embodiment, in response to receiving workload execution policy 106, orchestrator 114 in initiating compute domain 110 designates one or more compute nodes (e.g., XPUs) as a node cluster 118 to support workload 104. Other node clusters (not shown) in initiating compute domain 110 may be designated by orchestrator 114 to support other workloads by tenant 102 or another tenant(s). The node cluster 118 assigned to workload 104 may include a homogenous or heterogeneous set of compute nodes. The initiating compute domain orchestrator 114 may send a request (e.g., broadcast) for additional resources needed by workload 104 to supporting compute domain 150. In response to receiving the request from initiating compute domain 110, orchestrator 154 in supporting compute domain 150 may designate one or more compute nodes (e.g., XPUs) as a node cluster 158 to support workload 104. Other node clusters (not shown) in supporting compute domain 150 may be designated by orchestrator 154 to support other workloads by tenant 102 or another tenant(s). The node cluster 158 assigned to workload 104 may include a homogenous or heterogeneous set of compute nodes.

It should be noted that the node clusters (e.g., 118, 158) designated for a workload may also include other types of nodes assigned to the workload including, but not necessarily limited to, storage nodes (e.g., solid state drives (SSD), hard disk drives (HDD), etc.), memory nodes (e.g., magnetic media, tape drives, optical media, random access memory (RAM), read-only memory (ROM), erasable programmable read-only memory (EPROM), electrically erasable programmable read-only memory (EEPROM), flash memory, removable media, and any other memory component), network nodes (e.g., network interface cards (NICs), wireless network interface cards (WNICs), smart network interface cards (smart NICs), etc.), network devices (e.g., network processors, switches, hubs, routers, gateways, bridges, modems, access points, etc.), and/or any other type of element that can be utilized by a workload. The selection and assignment, attestation, and provisioning of these other types of nodes may be performed in the same or similar manner as for compute nodes assigned to the workload and may be included in the same or different node clusters as the assigned compute nodes. For simplicity and ease of explanation, however, reference in this specification may refer only to compute nodes.

Security managers 112 and 152 may receive information about the assigned compute nodes from orchestrators 114 and 154, respectively, and dynamically attest the compute nodes of the respective designated node clusters 118 and 158. In one or more embodiments, the dynamic attestation can be performed by the appropriate security manager (e.g., 112 or 152) determining whether a particular compute node (e.g., CPU 122, GPU 124) meets the relevant requirement(s) specified in workload execution policy 106. If the relevant requirement(s) are met, then the compute node can be added to the appropriate node cluster 118 or 158. The workload execution policy 106 may include specific requirements about compute nodes to be verified during attestation. Compliance with workload execution policy 106 extends security across domains to enable secure interconnected computation across the domains.

Once the compute nodes are attested, initiating compute domain 110 can establish a trusted group of node clusters 130, which includes attested (trusted) node clusters 118 and 158 that are assigned to workload 104 by their respective compute domains 110 and 150. The trusted group of node clusters 130 can form part of a connected compute fabric 132 extending across initiating compute domain 110 and supporting compute domain 150. As the needs of workload 104 change during the execution time of the workload, the compute nodes designated within node cluster 118 and/or within node cluster 158 may be modified in response. Moreover, in some scenarios, a node cluster for a given domain may be removed from the trusted group of node clusters 130 and a new node cluster in that domain, or in another domain, may replace the removed node cluster.

Any of the elements of FIG. 1 may be coupled together in any suitable manner such as through one or more networks (e.g., 105). A network may be any suitable network or combination of one or more networks using one or more suitable networking protocols. A network may represent a series of nodes, points, and interconnected communication paths for receiving and transmitting packets of information that propagate through a communication system. For example, a network may include one or more firewalls, routers, switches, security appliances, antivirus servers, or other useful network devices. A network offers communicative interfaces between sources and/or hosts, and may comprise any local area network (LAN), wireless local area network (WLAN), metropolitan area network (MAN), Intranet, Extranet, Internet, wide area network (WAN), virtual private network (VPN), cellular network, or any other appropriate architecture or system that facilitates communications in a network environment. A network can comprise any number of hardware or software elements coupled to (and in communication with) each other through a communications medium. In various embodiments, an element of FIG. 1 (e.g., tenant 102, orchestrators 114, 154, security managers 112, 152) may communicate through a network to establish, modify, and teardown a trusted group node clusters for a workload based on the particular needs outlined in a workload execution policy for the workload.

Figure 2:
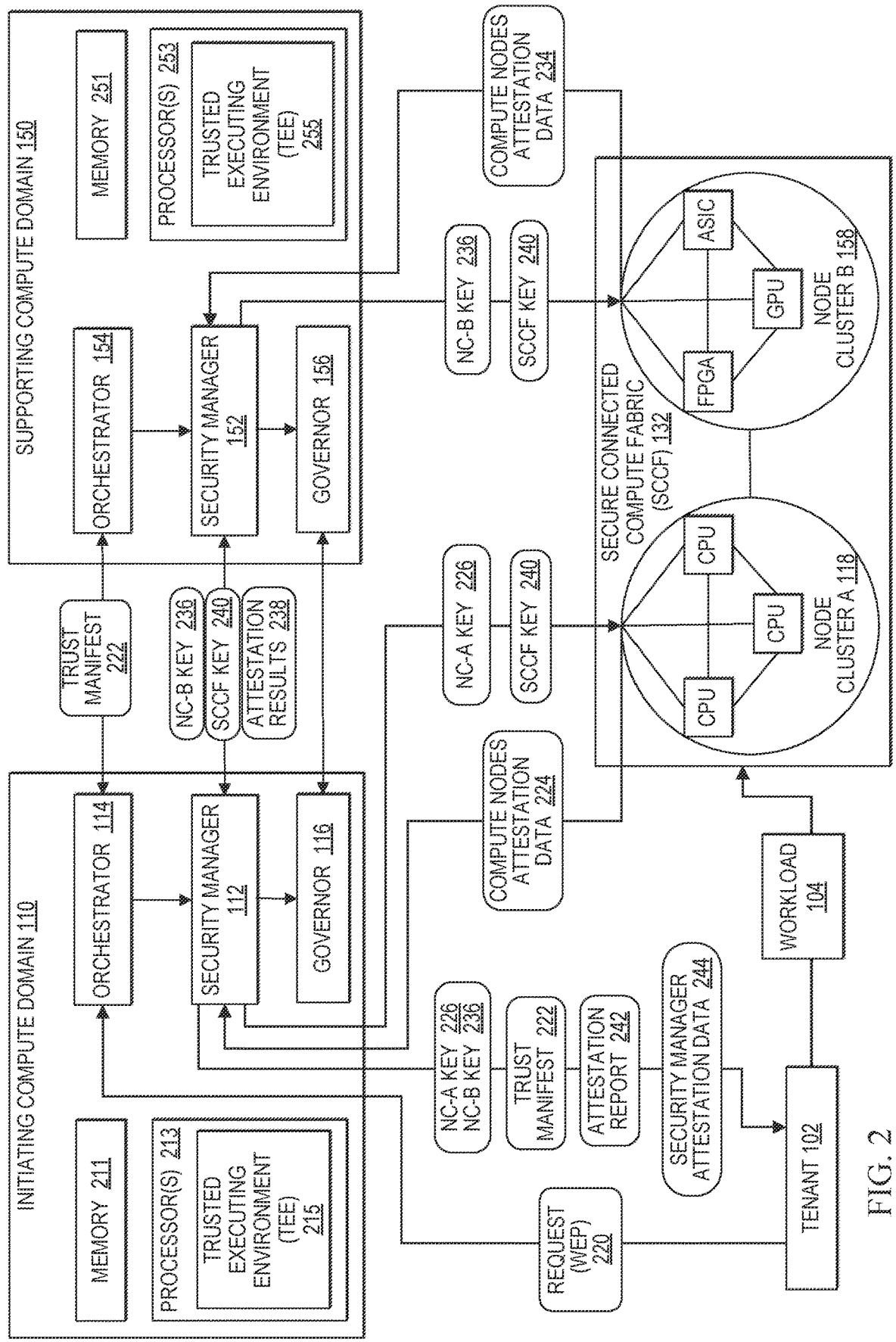
FIG. 2 is a block diagram illustrating example computing systems to provide a secure connected group of node clusters for a workload in a multi-domain environment according to an embodiment.

FIG. 2 is a block diagram illustrating additional possible details of multi-domain environment 100 providing a trusted group of node clusters for a workload according to an embodiment. Each compute domain 110 and 150 includes entities that cooperate to provide a trusted and connected group of node clusters in the multi-domain environment 100. The multi-domain environment 100 could be, for example, cloud-to-cloud, cloud-to-edge, edge-to-cloud, or edge-to-edge. In at least one embodiment, the entities to provide the trusted group of node clusters 130 include orchestrators 114 and 154 and security managers 112 and 152. Additionally, governors 116 and 156 (also referred to herein as "monitoring engine") may also be included to enable monitoring of the trusted group of node clusters, collecting telemetry data, and reporting the collected telemetry data and other information related to the workload execution. These entities may be implemented in hardware, software, firmware, or any suitable combination thereof.

Initiating compute domain 110 can include one or more processors 213, which may include one or more cores and may be embodied as any suitable processing device(s) (e.g., CPUs, GPUs, FPGAs, etc.). The one or more processors 213 may embody a single compute entity (e.g., computing system or device) in which orchestrator 114, security manager 112, and governor 116 may be collocated. Alternatively, the one or more processors 213 may embody multiple independent compute entities for implementing orchestrator 114, security manager 112, and governor 116 separately or in any suitable combination. Processors 213 may include one or more Trusted Execution Environments (TEEs) 215 to support attestation of compute nodes (e.g., XPUs) in a node cluster to be assigned to a workload, generation of shared secret keys for node clusters and tenants, and other secure operations such as provisioning the keys in the node clusters and tenants. TEEs 215 may include, but are not necessarily limited to, Software Guard Extensions (SGX) technology by Intel Corp., technology under the name or trademark of TrustZone by ARM, Ltd., technology under the name or trademark of SEV by Advanced Micro Devices, Inc., or a trusted virtual machine. Initiating compute domain 110 may include at least one memory 211 for storing data, at least some of which may be related to assigning resources for workloads, attesting the assigned resources, and/or establishing a trusted and connected group of node clusters based on the assigned and attested resources. At least one memory 211 may be integrated with, or external to the one or more compute entities implementing orchestrator 114, security manager 112, and governor 116.

Similarly, supporting compute domain 150 can include one or more processors 253, which may include one or more cores and may be embodied as any suitable processing device(s) (e.g., CPUs, GPUs, FPGAs, etc.). The one or more processors 253 may embody a single compute entity in which orchestrator 154, security manager 152, and governor 156 may be collocated. Alternatively, the one or more processors 253 may embody multiple independent compute entities for implementing orchestrator 154, security manager 152, and governor 156 separately or in any suitable combination. Processors 253 may include one or more Trusted Execution Environments (TEEs) 255 to support attestation of compute nodes (e.g., XPUs) in a node cluster to be assigned to a workload, generation of shared secret keys for node clusters and tenants, and other secure operations. TEEs 255 may include, but are not necessarily limited to, Software Guard Extensions (SGX) technology by Intel Corp., technology under the name or trademark of TrustZone by ARM, Ltd., technology under the name or trademark of SEV by Advanced Micro Devices, Inc., or a trusted virtual machine. Initiating compute domain 150 also includes at least one memory 251 for storing data, at least some of which may be related to assigning resources for workloads, attesting the assigned resources, and/or establishing a trusted and connected group of node clusters based on the assigned and attested resources. At least one memory 251 may be integrated with, or external to the one or more compute entities implementing orchestrator 154, security manager 152, and governor 156.

Various keys may be used in one or more embodiments to enable communications associated with the workload to be cryptographically secured (e.g., by encryption). Any suitable form of symmetric or asymmetric encryption may be used for encrypting communications between the nodes of a workload. Examples include, but are not necessarily limited to Advanced Encryption Standard (AES), Rivest-Shamir-Adleman (RSA), Triple Data Encryption Standard (Triple DES), Twofish, A key may be any random or deterministic character string. A key (or a pair of keys) may be shared among particular entities to enable secure communications between those entities. In some implementations, each node cluster is provided with a unique key for communications among the nodes of that cluster and for communications between the tenant and each node of that cluster. In other implementations, the same key may be used for communications in all of the node clusters. In some implementations, a secure connected compute fabric (SCCF) key may be provided to each node cluster to enable communications between the nodes of any one cluster and the nodes of any other cluster in the trusted group of node clusters.

In some embodiments, keys may be generated by security managers, for example, using a cryptographic key generator or any other suitable random or deterministic data generator.

In other examples, the key may be provided by a secure separate entity or area of memory accessible to the first security manager.

Generally, orchestrators (e.g., 114 and 154), are configured to activate, control, and configure the physical elements (e.g., XPUs such as CPUs 122 and 162, GPUs 124 and 164, VPUs 126, ACCs 128, FPGAs 166, ASICs 168, IPUs, etc.) of their individual compute domains. In one or more embodiments, orchestrators are configured to manage resource allocation and workload assignment for a workload (e.g., 104) to be executed in a secure connected compute fabric (e.g., 130) extended across two or more compute domains (e.g., 110 and 150) and containing a trusted group of node clusters (e.g., 118 and 158) from the two or more compute domains. Each orchestrator manages its own local node clusters, compute resource assignment, and utilizations. For example, orchestrator 114 manages node cluster A 118, and orchestrator 154 manages node cluster B 158. Furthermore, each orchestrator can negotiate resource allocation with another orchestrator in a remote or separate compute domain. For example, orchestrator 114 (in the initiating compute domain that receives a request for resources from tenant 102) can request and obtain additional resources from orchestrator 154 (in the supporting compute domain). In some scenarios, orchestrator 154 can, in response to the request from orchestrator 114, request additional resources from one or more other orchestrators in other compute domains (not shown). Furthermore, orchestrator 114 can request additional resources for the workload from other orchestrators in other compute domains.

Orchestrators are responsible for discovery of available orchestrators across compute fabric (e.g., including cloud and neighboring edges), addition or removal of trusted node clusters (e.g., 118, 158) to the compute fabric, allocation and deallocation of compute (and other) resources to the tenant based on the compute needs, maintaining a mapping of the tenant workload to the available trusted node cluster, and requesting an appropriate security manager (e.g., 112, 152) to verify the attestation of a node cluster against a workload execution policy (e.g., 106), or a portion thereof, associated with the tenant that requested resources. In some scenarios, the workload execution policy may be provided (e.g., by sending or identifying) by the tenant. Orchestrators are involved in facilitating the formation or establishment of node clusters (e.g., 118, 158) and a trusted group of node clusters (e.g., 130) in a secure connected compute fabric (e.g., 132), and the acceptance of the recommended compute (and other) resources into a node cluster determined by a security manager after it conducts attestation of the node cluster.

An orchestrator (e.g., 114, 154) may comprise any suitable logic. In various embodiments, the orchestrator comprises a processor (e.g., 213, 253) operable to execute instructions stored in a memory (e.g., 211, 251) and any suitable communication interface to communicate with the computing infrastructure (e.g., 110, 150) to direct workload placement and perform other orchestrator functions. In one example, orchestrators 114, 154 may correspond to a cloud management platform, e.g., OpenStack® (cloud operating system), CloudStack® (cloud computing software) or Amazon Web Services (AWS), with modifications to achieve functions described herein.

In one or more embodiments, a security manager (e.g., 112, 152), is a trusted entity that controls admittance of compute nodes (e.g., XPUs) in a given compute domain into a secure connected compute fabric extended across the given compute domain and one or more other compute domains. A security manager conducts attestations for compute nodes in the security manager's associated compute domain to form at least one trusted node cluster in the associated compute domain. A trusted node cluster in a particular compute domain may include one or more compute nodes in the particular compute domain that have been verified by the security manager associated with the particular compute domain. The security manager grants (or denies) admission of each compute node in a trusted node cluster(s) into a secure connected compute fabric (e.g., 132) based on verifying that the compute node adheres to a workload execution policy (e.g., 106) that is associated with the tenant (e.g., 102) requesting resources for a workload (e.g., 104). A tenant (e.g., 102) can implicitly own or attest a security manager before admitting the security manager into the tenant's trusted compute base (TCB), and requesting resources from the security manager to execute a workload.

A security manager (e.g., 112, 152) also evaluates a trust manifest before allowing a compute node to be admitted into the trusted and extended compute fabric. A trust manifest may identify each compute node and the compute domain associated with the identified compute node that is admitted into a trusted group of node clusters in a compute fabric that extends across two or more compute domains. A trust manifest may be generated for each trusted group of node clusters assigned to a respective workload. At least one security manager of the multi-domain environment maintains a mapping of each trust manifest to the appropriate tenant and the workload. In one example, a universally unique identifier (UUID) may be used for the tenant and a different UUID may be used for the workload to complete the mapping to the trust manifest. The mapping may be maintained in any suitable storage structure (e.g., table, database, linked list, arrays, etc.) using any suitable memory or storage elements. The mapping allows audits of workload executions to be conducted against the assigned trusted group of node clusters.

As the resource needs of a workload execution changes over time, certain compute nodes in the trusted groups of node clusters may need to be added or removed. One or more embodiments disclosed herein render tenant interaction unnecessary when a compute node is added or removed from the trusted group of node clusters for the workload. A security manager attests a pool of compute resources (e.g., accelerators, CPUs, GPUs, other XPUs, etc.) using a workload execution policy (e.g., 106) that describes the group of required (or desired) resources for the workload. Other resources could include storage devices, network devices, memory devices, for example. This attestation of the pool of resources may be performed instead of individual attestations. In other embodiments, individual attestations may be performed instead of, or in addition to, the attestation of the pool of resources. Thus, in some embodiments the attestation report may also include specific information about current member devices in the node cluster (or pool of resources) attested by the security manager. In addition, in order to bring multiple node clusters (which are each assigned to the same workload) in different compute domains into a secure connected compute fabric spanning the different compute domains, security managers in the different compute domains collaborate to enforce the tenant's workload execution policy for the workload across all node clusters assigned to the workload.

Security managers (e.g., 112, 152) may be implemented in numerous alternative configurations, all of which are considered within the scope of this disclosure. For example, a security manager may be an independent compute entity that is communicatively coupled to an orchestrator (e.g., 114, 154) and a governor (e.g., 116, 156). In another example, a security manager of a compute domain may be collocated in a workload device (e.g., processors 113 or 153 that can be CPUs or accelerators that implement control plane logic) of the compute domain. The workload device may also implement an orchestrator and/or a governor for the compute domain. In at least one embodiment, security managers (e.g., 112, 152) comprise any suitable logic, instructions, code, software, or firmware and run inside a trusted execution environment (e.g., 115, 255). Security managers may also be implemented at least partially in hardware in some embodiments.

In another possible implementation, at least some of the functions performed by a security manager (e.g., 112, 152) in a multi-domain environment may be performed external to the associated compute domain (e.g., 110, 150) in the multi-domain environment. An external security manager could be an independent compute entity operably and communicatively coupled to local security managers in each of the compute domains to enforce consistent security policies for the group(s) of node clusters created by the multiple compute domains.

A governor (e.g., 116, 156) is responsible for the runtime monitoring of a workload execution across a secure connected compute fabric (e.g., 132) in a trusted group of node clusters (e.g., 130). The governor can collect telemetry data along with the trust manifest to create a dynamic runtime trust report for a tenant. The governor can be attested by a security manager (e.g., 112, 152) or directly by the tenant (e.g., 102) associated with the workload (e.g., 104) being monitored. Similar to a security manager, a governor of a compute domain could be an independent compute entity, or it could be collocated in a workload device (e.g., processors 113 or 153 that can be CPUs or accelerators that implement control plane logic) of the compute domain. The workload device may also implement an orchestrator and/or a security manager for the compute domain. In at least one embodiment, governors (e.g., 116, 156) run inside a trusted execution environment (e.g., 115, 255).

A workload execution policy (e.g., 106), also referred to herein as a "WEP," is associated with a tenant (e.g., 102) and may be specific to a particular workload (e.g., 104) of the tenant. The WEP may be stored in any suitable storage or memory (e.g., 211, 251) with integrity protection. In one or more embodiments, a WEP for a particular workload can include one or more policies for the resources to be provisioned for the workload in a multi-domain environment. The WEP may be an agreement between a tenant (e.g., 102) and a compute domain owner (e.g., CSP or edge infrastructure owner). The WEP may be provided to an orchestrator (e.g., 114) to support the tenant's workload (e.g., 104).

A WEP can include, but is not limited to, security and/or privacy attributes (also referred to herein as "security requirements"). Security requirements can describe the security properties for a compute environment to provide for a given workload. Examples of security requirements include, but are not necessarily limited to, (1) a CPU supporting a trusted execution environment, (2) devices (e.g., GPU, FPGA) supporting particular authentication protocols (e.g., Security Protocol and Data Model (SPDM) authentication), (3) cryptographic algorithms that are National Institute of Standards and Technology (NIST) compliant and use AES 256-bit encryption by cryptographic modules, (4) Internet Protocol Security (IPSec) protection used during network transfers, (5) PCIe link protection per PCIe integrity and data encryption (IDE) specification, and (6) memory and/or storage encryption and integrity protection and the strength of the cryptographic algorithms. A WEP may include any one or more of these example security requirements, any other security or privacy requirements, or any suitable combination thereof.

Policies in the WEP can also include performance, latency, and/or carbon footprint requirements. Some policies in the WEP can be defined or selected by either the infrastructure owner, the tenant, or a third party (e.g., an industry governing body or standards body). An environment description in the WEP can include many different levels of abstraction. For example, security requirements and/or properties may include a list of specific hardware, software, firmware, or any other suitable approach for describing the desired trusted computing base (TCB). In one example, a security policy may require that the workload (or a portion of the workload) be executed in a TEE of a compute node, or in a particular type of TEE. Policies in the WEP can prescribe the regulatory and/or standards compliance, such as General Data Protection Regulation (GDPR) law on data protection and privacy in the European Union and/or Federal Information Processing Standards (FIPS) 140-3 in the United States. WEP policies can cover heterogeneous and/or homogeneous environments for the underlying resources.

A WEP may be static or may be dynamic, allowing them to evolve over time to accommodate TCB recovery of certain devices. For dynamic policies, depending on the embodiment, either the tenant, the infrastructure owner, or any authorized third party approves policy updates. In some cases, the WEP might not include confidentiality requirement. Some environments, however, may prefer to keep the policy confidential (e.g., by encryption). In one or more embodiments, whether encrypted or not, the integrity of the WEP may be protected against unauthorized modification due to malicious actions of an adversary (e.g., malicious software, malicious actor, etc.) or inadvertent actions by human operators or entities (e.g., software bug). For example, integrity violations can be detected when actions are taken such as reading, storing, or communicating a WEP by calculating an integrity code (e.g., a message authentication code, one-way hash, etc.) over the WEP or a portion thereof and comparing the calculated integrity code to an expected value of the integrity code that was previously calculated over the WEP or the portion thereof. A mismatch of the calculated integrity code and the expected, previously calculated integrity code can indicate an integrity violation has occurred and appropriate actions can be taken.

It should be noted that a WEP could be configured at any level of complexity, ranging from a single policy or requirement to many different types of policies (e.g., policies addressing security, performance, regulatory requirements, etc., and any combination thereof). For example, a single policy could include one requirement that is applied to all of the relevant resources (e.g., vendor of hardware, TEE execution requirement, latency requirement, or any other single policy). A complex policy could include multiple policies or requirements within multiple types of policies (e.g., security, performance, regulatory, or any other category or type, or any combination thereof.).

A security manager is a central trusted entity for establishing a trusted node cluster to support a workload in a multi-domain environment. A trust flow to establish a trusted node cluster (e.g., 118, 158) involves a tenant (e.g., 102), a security manager (e.g., 112, 152), a governor (e.g., 116, 156), and the resulting trusted node cluster (e.g., 118, 158). In initiating compute domain 110 for example, tenant 102 attests the security manager (e.g., 112), and the security manager acts as the tenant's trusted representative to attest compute nodes selected by an orchestrator (e.g., 114) for a workload, and establish a trusted node cluster (e.g., 118). The security manager may also attest a governor (e.g., 116), which collects telemetry and generates audit reports of the workload execution.

A more detailed example of a trust flow to establish trusted node clusters, and a trusted group of those trusted node clusters, will now be described with reference to FIG. 2. Tenant 102 may can send a request 206 to the orchestrator 114 of initiating compute domain 110. The request may specify or otherwise indicate resources (e.g., compute, storage, networking, memory) that are needed to host a particular workload 104. The request 206 may include a workload execution policy (WEP) or an identification of the policy associated with the workload. The WEP is to be used by the initiating compute domain 110 to select the requested resources and assign the selected resources to the workload, and to submit request(s) to other domains for resources for the workload if the initiating compute domain does not supply all of the requested resources.

Upon receiving the request for resources and obtaining the WEP, orchestrator 114, can identify and allocate resources that are available in the initiating compute domain 110 and that satisfy the requirements of the WEP. For example, the WEP may include a requirements for three CPUs, one FPGA, one GPU, and one special-purpose ASIC. If orchestrator 114 determines that the initiating compute domain 110 cannot provide all of the resources specified in the request 220, then other compute domains that may have additional resources are identified (e.g., using a broadcast or other communication). In this example, orchestrator identified supporting compute domain 158 as a domain that may be capable of providing resources for the workload. It should be noted that in some scenarios, a workload may be designed to run in multiple domains. For example, the request 220 may require that certain portions of a workload run in a particular domain, while allowing or requiring other portions of the workload to run in one or more other domains. By way of illustration, a resource request from a tenant for a workload may require sensitive portions of the workload (e.g., workload computations involving confidential or sensitive information) to be run in an edge domain, while allowing or requiring large computations of the workload that are latency tolerant to be offloaded to run in one or more cloud domains. In another scenario, an orchestrator of an initiating compute domain may decide to offload some or all of a workload based on the domain's particular resource allocation criteria or any other suitable criteria. By way of illustration, an edge domain may have resource allocation criteria to provision its resources for critical real-time processing needs of workloads, such as autonomous driving workloads, and offload remaining computations of the workloads, and other less critical workloads, to other domains.

Orchestrator 114 can create a trust manifest 222 based on the WEP and can provide the trust manifest to orchestrator 154 in supporting compute domain 150, along with a request for additional resources for the workload. The trust manifest may include information from the WEP that allows security managers 112 and 152 to verify the trust properties of selected resources on behalf of the tenant. Depending on the particular implementation, some or all of the requirements for the requested resources are included in the trust manifest. For example, the WEP may contain various types of requirements (e.g., security, power, performance, functionality, etc.). In a first implementation, the security requirements used by security managers 112 and 152 to attest the assigned resources in their respective domains can be extracted and included in the trust manifest, while other requirements used by orchestrators 114 and 154 to select and assign resources in their respective domains may be extracted and maintained separately from the trust manifest. Orchestrator 114 can provide these extracted other requirements to orchestrator 154, along with the trust manifest. In another implementation, the security requirements used by security managers and the other requirements used by the orchestrators may be extracted from the WEP and combined to create the trust manifest. In other implementations, the WEP itself may serve as the trust manifest.

In further implementations, different trust manifests may be created for different domains. Requirements that are relevant only to a particular domain may be included only in the trust manifest provided to that particular domain. For example, different trust manifests may be tailored to address particular threats in different domains (e.g., security requirement directed to advanced hardware threats may be included only in a trust manifest for an edge domain). Similarly, if the WEP requirements used by orchestrators are extracted and separately maintained, then only the requirements that are relevant to a particular domain may be provided to that domain (e.g., specifications for accelerators to be allocated in a cloud domain are provided only to the cloud orchestrator). In any of the possible implementations, if needed, the WEP requirements may be converted into a consumable data structure for the security managers, governors (if any), and/or orchestrators.

Orchestrator 114 and orchestrator 154 collaborate to assign compute resources to the workload based on one or more requirements included in the WEP, which may or may not be extracted from WEP and included in trust manifest 222 as previously discussed. The trust manifest may be provided by orchestrator 114 to orchestrator 154, along with a request for resources for workload 104. In this example scenario, orchestrator 114 assigns three CPUs (e.g., node cluster A 118) to the workload, and orchestrator 154 assigns an FPGA, a GPU, and an ASIC (e.g., node cluster B 158) to the workload. Additional information indicating which resources have been assigned in each domain may be exchanged by orchestrators 114 and 154.

Orchestrators 114 and 154 may also provide the trust manifest 222, along with additional information about the assigned resources, to respective security managers 112 and 152. The additional information about the assigned resources could include, for example, respective identifiers of the assigned resources within the relevant domain, and optionally, metadata related to the assigned resources. In at least some embodiments, orchestrators 114 and 154 may additionally or alternatively provide the WEP itself to respective security managers 112 and 152.

Security manager 152 gathers attestation data 234 from the nodes assigned to the workload by orchestrator 154, which include the compute nodes in node cluster B 158 in this example. Security manager 152 can attempt to attest each compute node in node cluster B 158 based on the compute nodes attestation data and relevant policy requirements specified in the WEP. Alternatively, security manager 152 can attempt to attest the compute nodes as a cluster (or pool) based on the attestation data and relevant policy requirements specified in the WEP. The relevant policy requirements used to attest the assigned resources in the supporting compute domain 150 may be obtained by security manager 152 from the trust manifest or directly from the WEP. Security manager 152 can send attestation results 238 to security manager 112. In at least one embodiment, the relevant policy requirements include security requirements.

If the attestation for each compute node is successful, or if the attestation for the compute node cluster is successful (depending on the type of attestation being performed), then security manager 152 can generate or otherwise obtain a node cluster (NC-B) key 236. The NC-B key can be used to cryptographically secure communications among the compute nodes in node cluster B 158, and also communications between tenant 102 and the compute nodes in node cluster B 158. The NC-B key 236 can be provided by security manager 152 to the compute nodes in node cluster B 158. The NC-B key 236 may also be provided to security manager 112 so that security manager 112 can send the key to tenant 102.

Security manager 112 gathers compute nodes attestation data 224 from the nodes assigned to the workload by orchestrator 114, which include the compute nodes in node cluster A 118 in this example. Security manager 112 can attempt to attest each compute node in node cluster A 118 using the compute nodes attestation data 224 and relevant policy requirements specified in the WEP. The relevant policy requirements used to attest the assigned resources in the initiating compute domain 110 may be obtained by security manager 112 from the trust manifest or directly from the WEP. Security manager 112 can generate an attestation report 242 that aggregates attestation results of the individual compute nodes or the compute node clusters 118 and 158 from security managers 112 and 152, respectively.

If the attestation for each compute node in node cluster A 118 is successful, then security manager 112 can generate or otherwise obtain a node cluster (NC-A) key 226. The NC-A key 226 can be used to cryptographically secure communications among the compute nodes in node cluster A 118, and also communications between tenant 102 and the compute nodes in node cluster A 118. The NC-A key 226 can be provided by security manager 112 to the compute nodes in node cluster A 118.

If all of the compute nodes in node cluster A 118 and node cluster B 158 are attested, then the security managers 112 and 152 can establish at least one key (referred to as an "SCCF key") to enable secure communication in a secure connected compute fabric 132 containing node cluster A 118 and node cluster B 158 across domains 110 and 150. More specifically, the SCCF key can be used for secure communication between the CPUs in node cluster A 118 and the FPGA, GPU, and ASIC in node cluster B 158. The SCCF key 240 can be provided by security managers 112 and 152 to the compute nodes in the respective node clusters 118 and 158.

Security manager 112 communicates with tenant 102 and acts as tenant's delegate to attest nodes that are selected to be provisioned for the workload. Security manager 112 also attests itself to tenant 102 by providing security manager attestation data 244 to tenant 102. If tenant 102 determines that the security manager attestation data 244 is not verifiable, then the security manager 112 may not send any further information to tenant 102, and the selected resources in each domain 110 and 150 are not provisioned for the workload.

In other embodiments, security manager 112 provides attestation data 244 to tenant 102 prior to attesting the CPUs of node cluster A 118. If tenant 102 does not attest the security manager based on attestation data 244, then security manager 112 may not attempt to attest the assigned compute nodes on behalf of the tenant. In this case, resources are not provisioned for the workload and the trusted group of node clusters is not established. If the security manager is attested by the tenant, however, then the security manager may proceed with attempting to attest CPUs in node cluster A 118.

In yet other embodiments, orchestrator 114 in initiating compute domain 110 may communicate with security manager 112 to prompt the security manager to provide security manager attestation data 244 to tenant 102 prior to orchestrator 114 assigning resources to the workload and/or prior to the orchestrator requesting resources from other domains. If security manager 112 is attested by tenant 102 based on attestation data 244, then the orchestrator can select and assign resources for the workload and request additional resources from other domains. If the security manager is not attested by the tenant, then the orchestrator may refrain from selecting resources for the workload and requesting resources from other domains. The orchestrator may also notify the tenant that the tenant's request for resources cannot be satisfied.

Security manager 112 can also send an attestation report 242 to report the attestation results (e.g., success or failure) of the selected resources for the workload. Security manager 112 can also send trust manifest 222 (or the WEP) to tenant 102 to enable verification that the correct policies were used to select the resources.

If the attestation of security manager 112 is successful, then security manager can send the NC-A key 226 and the NC-B key 236 to tenant 102 to enable tenant 102 to cryptographically secure communications to compute nodes in node cluster A 118 and communications to compute nodes in node cluster B 158, respectively. Once the tenant receives the NC-A key 226 and the NC-B key 236, tenant 102 can encrypt workload 104 using any suitable cryptographic algorithms and the appropriate key to send the workload to the secure connected compute fabric 132. In some examples, all of the workload 104 may be sent to the initiating compute domain (e.g., node cluster A 118) and an appropriate compute node (and networking nodes, not shown) can forward selected portions of the workload 104 to node cluster B 158. In other embodiments, tenant 102 may communicate directly with both node cluster A 118 and node cluster B 158, using the appropriate node cluster key.

FIGS. 3A-3D illustrate example use scenarios of compute domains with multi-dimensional extensions of compute boundaries according to one or more embodiments. The examples in FIGS. 3A-3D illustrate possible use scenarios having two compute domains in which each compute domain is either a cloud infrastructure or an edge infrastructure, and a trusted zone extends from one compute domain to the other compute domain. A trusted zone corresponds to a connected compute fabric (e.g., connected compute fabric 132) having a trusted group of node clusters (e.g., trusted group of node clusters 130).

Figures 3A, 3B, 3C, 3D:
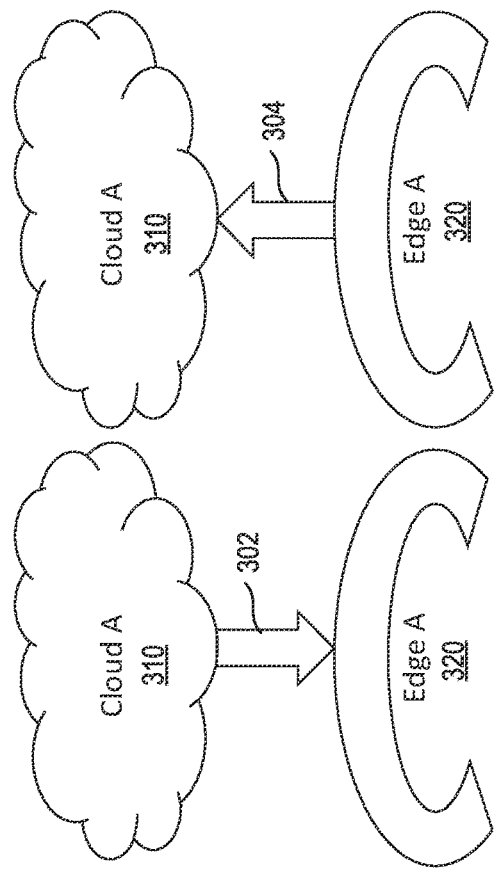
FIGS. 3A-3D is an illustration of possible use scenarios of compute domains with multi-dimensional extensions of compute boundaries according to one or more embodiments.

FIG. 3A illustrates a compute boundary extension 302 of a trusted zone initiated by cloud A 310 to an edge A 320. In this scenario, cloud A 310 represents initiating compute domain 110 and edge A 320 represents supporting compute domain 150. FIG. 3B illustrates a compute boundary extension 304 of a trusted zone initiated by edge A 320 to cloud A 310. In this scenario, edge A 320 represents initiating compute domain 110 and cloud A 310 represents supporting compute domain 150. FIG. 3C illustrates a compute boundary extension 306 of a trusted zone initiated by edge A 320 to an edge B 340. In this scenario, edge A 320 represents initiating compute domain 110 and edge B 340 represents supporting compute domain 150. In one possible use scenario, FIG. 3C is illustrative of neighborhood edge clusters.

FIG. 3D illustrates a compute boundary extension 308 of a trusted zone initiated by cloud A 310 to a cloud B 330. In this scenario, cloud A 310 represents initiating compute domain 110 and cloud B 330 represents supporting compute domain 150.

Cloud and edge infrastructures may be owned by infrastructure owners. For example, cloud infrastructures (e.g., clouds 310 and 330) may be owned by respective (or the same) cloud service providers (CSPs), and edge infrastructures (e.g., edges 320, 340) may be owned by respective (or the same) edge platform owners. Generally, an infrastructure owner is to orchestrate workload execution by managing available resources, allocating them upon request, and scheduling workload execution.

A CSP can be an entity that operates and manages cloud node clusters assigned to workloads. Tenants may not trust the CSP to enforce their security policy as CSP hardware and/or software may be compromised at some point. An edge owner can be an entity that operates and manages an edge infrastructure (e.g., edges 320, 340). An edge owner may be a tenant (e.g., an enterprise), a service provider (e.g., a telephone company such as a telephone service provider or telecommunications company), or a CSP. Embodiments disclosed herein may be flexibly applied to any scenario with a tenant and service providers as edge infrastructure owners.

Figure 4:
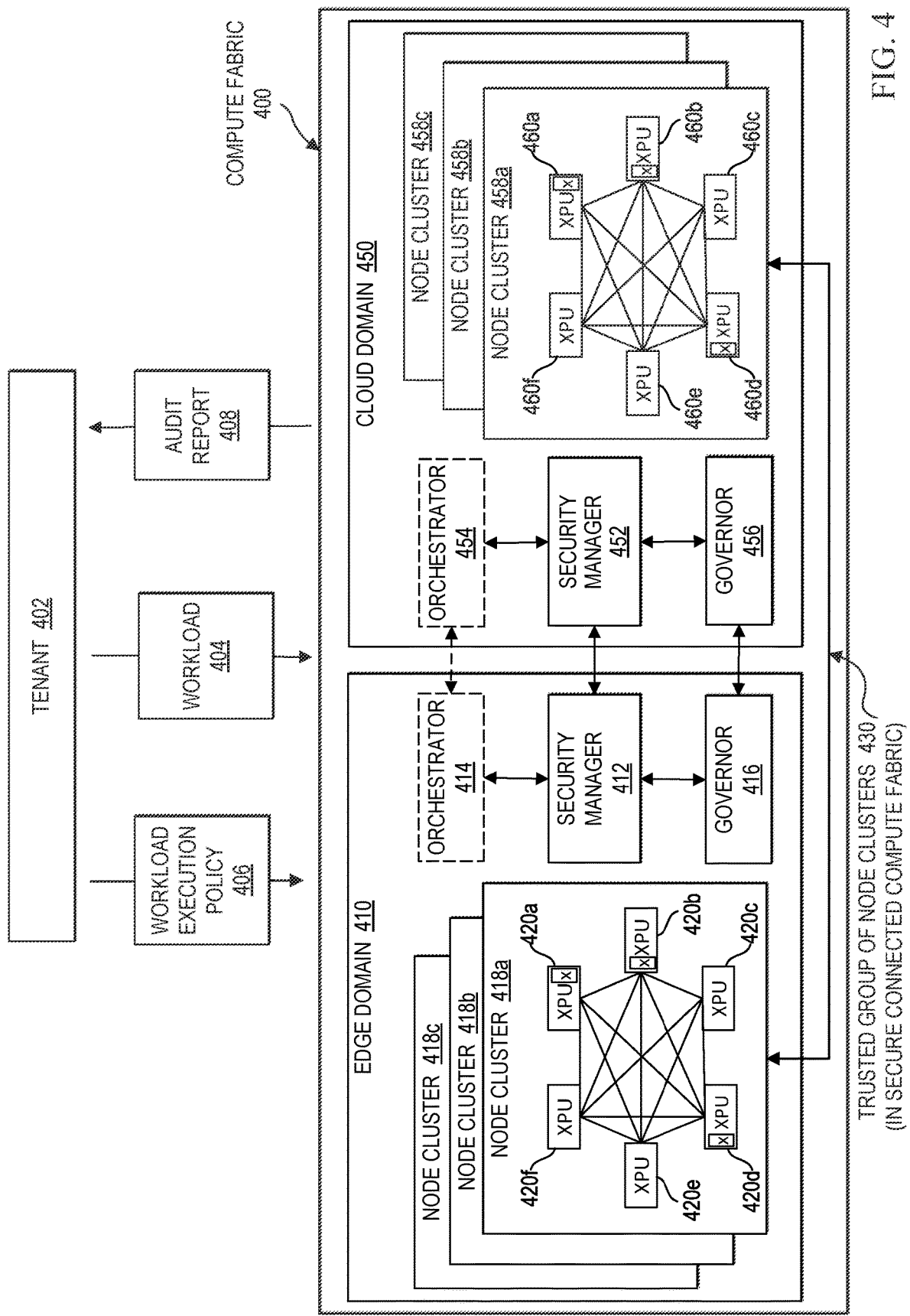
FIG. 4 is a block diagram illustrating an example compute fabric providing a trusted group of node clusters in an edge-to-cloud environment according to an embodiment.

FIG. 4 is a block diagram illustrating an example edge-to-cloud compute fabric 400 that includes a trusted group of node clusters 430 assigned to a workload 404 according to at least one embodiment. The trusted group of node clusters 430 defines a secure connected compute fabric within the edge-to-cloud compute fabric 400. The compute fabric 400 can contain other trusted entities (shown in solid lines), such as security managers 412 and 452 and governors 416 and 456, as well as untrusted entities (shown in dashed lines), such as orchestrators 414 and 454, which are not part of the secure connected compute fabric. Although the embodiment depicts the compute fabric 400 across an edge domain 410 and a cloud domain 450, it should be apparent that the compute boundaries (and therefore the secure connected compute fabric) could be extended to a multi-edge (e.g., two or more edge domains) and/or multi-cloud (e.g., two or more cloud domains) compute fabric as well.

In FIG. 4, a tenant 402 has a workload 404 and a workload execution policy 406 that is to be applied to the workload 404. For workload 404, one of the compute domains 410 or 450 functions as an initiating compute domain to receive a request from tenant 402 for resources for workload 404, and the other infrastructure functions as a supporting compute domain to receive a request from the initiating domain for additional resources for workload 404. Tenant 402 may also receive audit reports 408 from compute fabric 400 during the workload execution and/or upon completion of the workload execution, for example, from governors 416 and 456.

Edge domain 410 includes an orchestrator 414 and a security manager, and a governor 416. Cloud domain 450 includes an orchestrator 454, a security manager 452, and a governor 456. Orchestrators 414 and 454 may be similar to orchestrators 114 and 154, and security managers 412 and 452 may be similar to security managers 112 and 152. Orchestrators 414 and 454 and security managers 412 and 452 cooperate to assign resources for workloads, attest the assigned resources, and establish a trusted group of node clusters (or zones) based on the assigned and attested resources.

In this example, orchestrator 414 of edge domain 410 designates one or more compute nodes or XPUs (e.g., CPUs, GPUs, IPUs, VPUs, FPGAs, special purpose ASICs, etc.) in the edge domain 410 as a node cluster. Specifically, orchestrator 414 selects XPUs 420a, 420b, 420c, 420d, 420e, and 420f as a node cluster 418a in edge domain 410 to support workload 404. In some scenarios, other XPUs in edge domain 410 may be designated by orchestrator 414 as separate node clusters, such as node clusters 418b and 418c, and assigned to the same workload 404. In some scenarios, other XPUs in edge domain 410 may be designated by orchestrator 414 as separate node clusters, such as node clusters 418b and 418c, to support other workloads of tenant 102 or to support workload(s) of another tenant(s). Compute node clusters 418a-418c may include a homogenous or heterogeneous set of compute nodes depending on the particular requirements and needs of the associated workload(s).

Similarly, orchestrator 454 of cloud domain 450 designates one or more compute nodes or XPUs (e.g., CPUs, GPUs, IPUs, VPUs, FPGAs, special purpose ASICs, etc.) in the cloud domain 450 as a node cluster. Specifically, orchestrator 454 selects XPUs 460a, 460b, 460c, 460d, 460e, and 460f as a node cluster 458a in cloud domain 450 to support workload 404. In some scenarios, other XPUs in cloud domain 450 may be designated by orchestrator 454 as separate node clusters, such as node clusters 458b and 458c, and assigned to the same workload 404. In some scenarios, other XPUs in cloud domain 450 may be designated by orchestrator 454 as separate node clusters, such as node clusters 458b and 458c, to support other workloads of tenant 102 or to support workload(s) of another tenant(s). Cloud node clusters 458a-458c may include a homogenous or heterogeneous set of compute nodes depending on the particular requirements and needs of the associated workload(s).

FIG. 4 depicts the concept of edge domain 410 and cloud domain 450 cooperating to form trusted zones of execution over compute fabric 400. Generally, trusted zones of execution correspond to a secure connected compute fabric (within compute fabric 400) of homogenous or heterogenous compute resources available for a workload execution. Each trusted zone of execution can be a cluster of one or more XPU nodes (and potentially other types of nodes), and each compute domain, such as edge domain 410 and cloud domain 450, may have one or more trusted zones of execution for a workload. Accordingly, trusted zones of execution can be instantiated as cloud infrastructure node clusters (e.g., cloud node clusters 458a-458c), edge infrastructure node clusters (e.g., edge node clusters 418a-418c), or both (e.g., trusted group of node clusters 430). An intra- and/or inter-connectivity plane in the compute fabric 400 (and therefore, also in the secure connected compute fabric) can include one or more connectivity protocols (e.g., peripheral connect interface express (PCIe), Ethernet, Wi-Fi 802.11, ZigBee, GSM, etc.), which use any suitable communication protocols (e.g., Transmission Control Protocol/Internet Protocol (TCP/IP), User Datagram Protocol (UDP), etc.).

Policy-based attestation provides an efficient mechanism to evaluate the eligibility of a node cluster to participate in a secure connected compute fabric within an edge-to-cloud compute fabric 400. The policy-based attestation scheme has the flexibility to allow the use of a variety of metrics to determine the eligibility of each XPU (e.g., 420a-420f, 460a-460f) to be included in a node cluster (e.g., 418a, 458a) that is to be added to a trusted group of node clusters (e.g., 430) (or trusted zones of execution) for a workload.

Thus, the policy-based attestation makes it possible to evaluate eligibility of heterogenous devices from multiple hardware vendors. Also, a policy based mechanism enables the scenario where the tenant does not have pre-knowledge of what compute nodes it will be assigned and hence cannot call out the specific attestation data the compute devices must present. This also supports compute clusters comprised of multi-vendor hardware more easily since the attestation data produced by different hardware vendors' compute devices (e.g. CPU, GPU, FPGA) is not same and it is hard to specify and to verify specific attestation data from different hardware vendors.

Figure 5A:
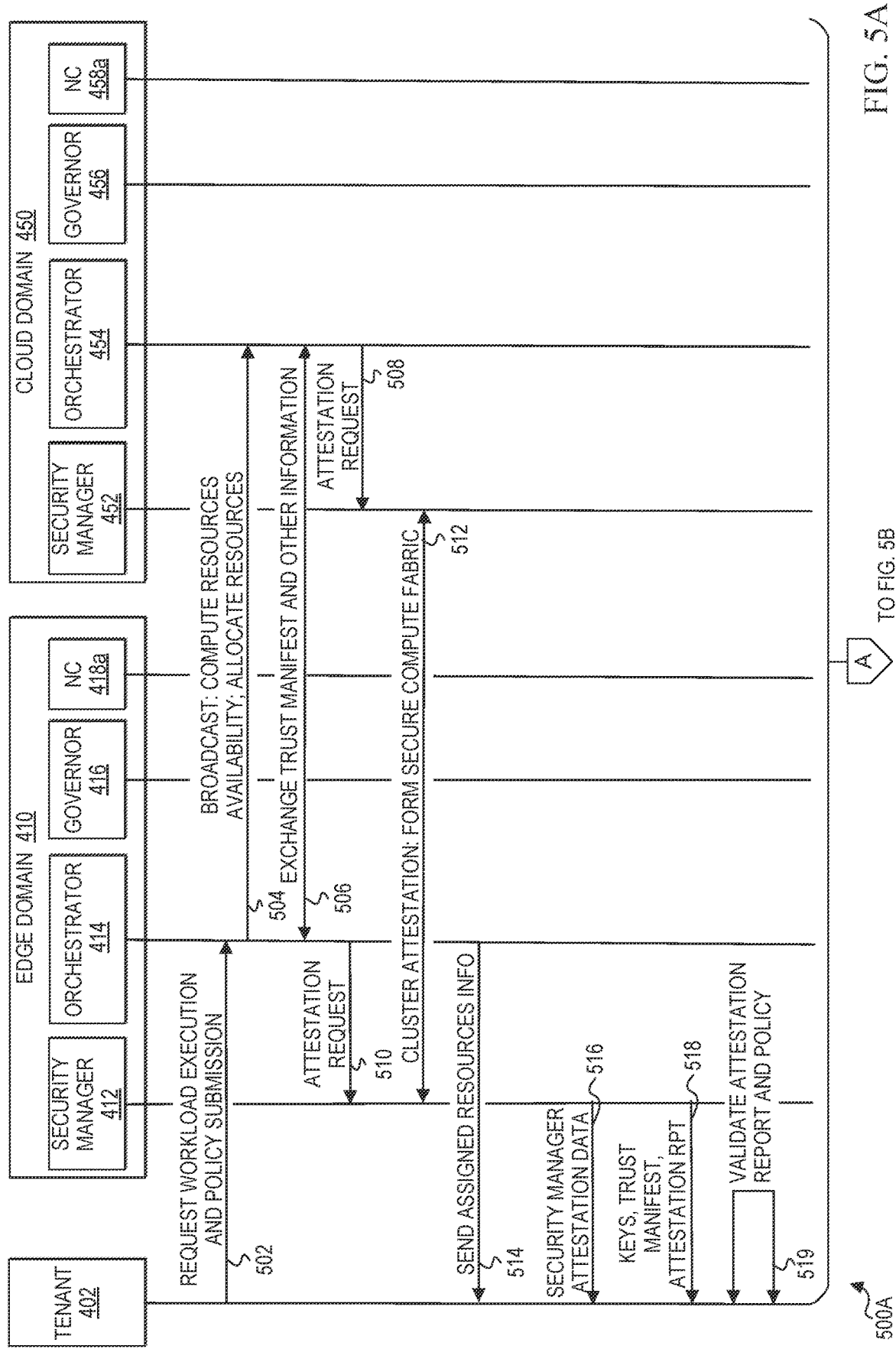

FIGS. 5A-5B illustrate flow diagrams 500A-500B of interactions to provide a trusted group of node clusters in a multi-domain environment to support a workload according to an embodiment. The interactions occur among tenant 402, edge domain 410, and cloud domain 450. Edge domain 410 includes security manager 412, orchestrator 414, governor 416, and node cluster 418a. Cloud domain 450 includes security manager 452, orchestrator 454, governor 456, and node cluster 458a. In this scenario, edge domain 410 serves as the initiating compute domain (e.g., similar to initiating compute domain 110) and cloud compute domain serves as the supporting compute domain (e.g., similar to supporting compute domain 150). In other scenarios, cloud domain 450 could serve as the initiating compute domain, and edge domain 410 could serve as the supporting compute domain. Also, it should be apparent that although node clusters 418a and 458a include only XPUs, other types of nodes (e.g., storage, network, memory, etc.) could be included in the node clusters.

Generally, a workload may be executed in a multi-domain environment by provisioning resources in the domains for the workload. Resources may be provisioned by establishing a trusted group of node clusters and providing appropriate keys to tenant 402 to communicate with the trusted group of node clusters. Flow diagrams 500A-500B illustrate an example lifecycle of a trusted group of node clusters in a secure connected compute fabric across multiple domains. The lifecycle includes a workload request, resource allocation, trust establishment, workload execution and monitoring, and teardown of the trusted group of node clusters when the workload has finished or has otherwise been terminated.

At 502, tenant 402 asks for resources for its workload 404 by sending a request to orchestrator 414 in edge domain 410. Edge domain 410 may be a cloud infrastructure or an edge infrastructure. In some embodiments, tenant 402 also provides a workload security policy to orchestrator by, for example, transmitting the policy with the request or identifying the policy for the orchestrator 414. The workload execution policy can contain requirements for resources (e.g., compute, storage, networking, memory) to be assigned to the workload in response to the tenant's request.

In response to receiving the request for resources, orchestrator 414 allocates one or more compute resources (e.g., XPUs 420a-420f) for the workload if compute resources are available in the edge domain that satisfy the workload execution policy. Orchestrator 414 may use information in the workload execution policy to select the resources best suited to meet the requirements of tenant 402.

If edge domain 410 cannot provide all of the resources requested by tenant 402, or if resources from other domains are to be requested by design (e.g., tenant request for particular domains to allocate particular resources, resource allocation criteria of the edge domain), then orchestrator 414 finds and collaborates with one or more other orchestrators in one or more other compute domains to fulfill the request for resources from the tenant. In at least one embodiment, orchestrator 414 creates a trust manifest from the workload execution policy. The trust manifest may include information from the workload execution policy that allows a security manager (e.g., edge security manager 412, cloud security manager 452) to verify the trust properties of selected resources on behalf of the tenant. Thus, tenant 402 does not need to know the details of the selected resources for a workload, but can be assured that the selected resources on each of the compute domains that supply resources comply with the requirements of the relevant workload execution policy.

As previously described herein, the trust manifest could include only security requirements used by security managers to attest the assigned resources or a combination of the security requirements and other requirements used by orchestrators to select and assign resources. In other implementations, the WEP itself could serve as the trust manifest. In yet further implementations, different trust manifests could be tailored with security requirements (and potentially other requirements) specific to respective domains.

At 504, orchestrator 414 identifies other compute domains whose resources may be needed for the workload. In one example, orchestrator 414 broadcasts a message to other compute resources to determine which compute domains have available compute resources.

If cloud domain 450 indicates that resources are available on its platform, then at 506, orchestrator 414 sends a request for resources, along with the trust manifest, to orchestrator 454 of cloud domain 450. Depending on the implementation, orchestrator 414 can also send other requirements from the WEP, separate from the trust manifest, to be used by orchestrator 154 to select and assign resources.

Orchestrator 414 and orchestrator 454 collaborate to assign compute resources to the workload. In response to receiving the trust manifest, if the requested compute resources are available in the cloud domain and comply with the other requirements (e.g., included in the trust manifest or provided separately) of the workload, then orchestrator 454 allocates one or more compute resources (e.g., XPUs 460a-460f) for the workload. Additional information indicating which resources have been assigned in each domain may be exchanged by orchestrators 414 and 454.

At 508 and 510, orchestrators 414 and 454 each provide the trust manifest to their respective security managers 412 and 452, along with information (e.g., unique identifiers, metadata) about the assigned resources in their respective domains. Orchestrator 414 requests security manager 412 to attest the assigned resources of edge domain 410, and orchestrator 454 requests security manager 452 to attest the assigned resources of cloud domain 450.

In one or more embodiments, the security managers 412 and 452 each (optionally) run inside a TEE of a respective compute node (e.g., in an independent compute node or collocated with an orchestrator in a workload device). Security managers 412 and 452 each gather attestation data from the assigned resources in their respective domains and check the attestation data against the trust manifest. Based on the attestation data, security managers 412 and 452 each determine whether the assigned resources in their respective domains meet the security requirements (and any other policies or requirements) specified in the trust manifest.

If the assigned edge resources meet the security requirements (and any other policies or requirements) specified in the trust manifest, then security manager 412 provisions the assigned edge resources with keys (referred to herein as "edge cluster keys") to admit the assigned edge resources into trusted edge node cluster 418a. The edge cluster keys enable communication by the assigned edge resources in trusted edge node cluster 418a with tenant 402 and with each other. Similarly, if the assigned cloud resources meet the security requirements (and any other policies or requirements) specified in the updated trust manifest, then security manager 452 provisions the assigned cloud resources with keys (referred to herein as "cloud cluster keys") to admit the assigned cloud resources into trusted cloud node cluster 458a. The cloud cluster keys enable communication by the assigned cloud resources in the trusted cloud node cluster 458a with tenant 402 and with each other. Edge cluster keys and cloud cluster keys can be shared with tenant 402 but may be kept secret from other entities.

Once the node clusters in each compute domain are attested, at 512, the security managers 412 and 452 may communicate to convey that attestations of their respective node clusters were successful. For example, if any one or more of the compute nodes in the edge node cluster or the cloud node cluster fail attestation, then a secure connected compute fabric is not established between the clusters and the attestation failures (and successes) may be reported to tenant at 518. If the attestations of each of the compute nodes in the edge node cluster and the cloud node cluster are successful, then at 512, the security managers can establish keys (referred to as "SCCF keys") to enable secure communication in compute fabric 400 across edge domain 410 and cloud domain 450. More specifically, the SCCF keys can be used for secure communication between assigned edge nodes in trusted edge node cluster 418a and assigned cloud nodes in trusted cloud node cluster 458a. The SCCF keys can be shared with assigned edge nodes in trusted edge node cluster 418a and assigned cloud nodes in trusted cloud node cluster 458a, but may be kept secret from other entities.

At 514, the orchestrator 414 in edge domain 410 (as the initiating compute domain) sends information related to the assigned resources in both the edge and cloud compute domains to tenant 402.

At 516, security manager 412 provides its own attestation data and attests itself to tenant 402 using any suitable attestation technique. In one example, security manager 412 provides hardware based attestation (e.g., SGX attestation).

In some embodiments, the security manager 412 provides its attestation data to tenant 402 prior to attesting the individual XPUs 420a-420f in the edge node cluster 418a (or attesting edge node cluster 418a as a whole) at 510. If security manager 412 is not attested by tenant 402 based on the security manager's attestation data, then security manager 412 does not attempt to attest XPUs 420a-420f (or node cluster 418a as a whole) and the assigned resources are not provisioned for the workload. If security manager 412 is attested by tenant 402, however, then operations may continue as described at 510, where the security manager attempts to attest XPUs 420a-420f (or node cluster 418a as a whole).

In some other embodiments, after receiving the request for resources at 502, edge orchestrator 414 may communicate with security manager 412 to prompt the security manager to provide its attestation data to tenant 402 prior to orchestrator 414 assigning resources to the workload and/or prior to the orchestrator 414 requesting resources from other domains. If security manager 412 is not attested by tenant 402 based on the security manager's attestation data, then orchestrator 414 does not select resources for the workload or request resources from other domains, and the orchestrator may notify tenant 402 that the request for resources cannot be satisfied. If security manager 412 is attested by tenant 402, however, then operations may continue after the request for resources is received at 502, and orchestrator 414 can select and assign resources for the workload and request additional resources from orchestrator 454 in cloud domain 450.

Once the security manager 412 has been attested by tenant 402, at 518, security manager 412 sends an attestation report indicating which edge and cloud resources were selected for the tenant's workload and whether the assigned resources meet the tenant's security policy (i.e., attestation success). Alternatively, the attestation report could include details associated with the assigned resources to allow tenant 402 to verify compliance with the security policy and potentially other requirements of the workload execution policy. If attestations of the edge and cloud assigned resources were successful, then a trusted group of node clusters has been established with appropriate keys for secure communications. In this case, security manager 412 also sends the shared secret key(s) provisioned for trusted edge node cluster 418a in edge domain 410 and the shared secret key(s) provisioned for trusted cloud node cluster 458a in cloud domain 450. These shared keys enable tenant 402 to securely communicate with nodes in node clusters 418a and 458a. Accordingly, resources are effectively provisioned for the workload once all of the keys (e.g., edge cluster key(s), cloud cluster key(s), SCCF key(s)) have been shared with the appropriate entities.

Security manager 412 may also send the workload execution policy (or a portion thereof) to tenant 402 to enable tenant to verify that the workload execution policy used to select, assign, and attest resources in edge and cloud compute domains is the same policy provided to orchestrator 414 when the tenant requested for the workload. In one or more embodiments, the shared secret keys (e.g., edge cluster key(s) and cloud cluster key(s)) are sent to tenant 402 over a secure channel. The attestation report and workload execution policy may also be sent to tenant 402 over the secure channel.

At 519, tenant 402 validates the attestation report to ensure that the delegated attestation of resources was successful, and also validates that the workload execution policy received from edge domain 410 is the same workload execution policy that tenant 402 provided to edge domain 410 when requesting resources for the workload.

Turning to flow 500B in FIG. 5B, once tenant 402 has validated the attestation report and the workload execution policy, then tenant 402 protects the workload using the shared secret keys to encrypt the workload and enable secure communication with the resources in the trusted node clusters 418a and 458a of the secure connected compute fabric. For example, an edge cluster key may be used to cryptographically protect the portion of the workload to be run by edge node cluster 418a, and a cloud cluster key may be used to cryptographically protect the portion of the workload to be run by cloud node cluster 458a. At 620 and 622, the cryptographically protected workload (or portions of the workload) may be submitted to the compute nodes in the secure connected compute fabric spanning the edge domain 410 and the cloud domain 450. It should be noted that tenant 402 may only communicate with compute nodes in trusted edge node cluster 418a, which can then forward appropriate portions of the workload to trusted cloud node cluster 458a. In other scenarios, tenant 402 may communicate directly with compute nodes in both trusted edge node cluster 418a and trusted cloud node cluster 458a to submit its workload.

During execution of the workload, the resources communicate with each other securely using the keys provisioned by the security managers. In one embodiment, the edge cluster key can be used for communication among edge nodes in trusted edge node cluster 418a, the cloud cluster key can be used for communication among cloud nodes in trusted cloud node cluster 458a, and the SCCF key can be used for communication between edge nodes in trusted edge node cluster 418a and cloud nodes in trusted cloud node cluster 458a.

The workload execution can trigger the governors 416 and 456 in each compute domain start monitoring the execution by collecting telemetry data. Telemetry data can be collected in all of the trusted node clusters of the trusted group of node clusters 430. For each trusted node cluster, a governor in the trusted node cluster's domain can collect the telemetry data. Accordingly, at 524, governor 456 of cloud domain 450 collects telemetry data from trusted cloud node cluster 458a, and at 526, governor 416 of edge domain 410 collects telemetry data from trusted edge node cluster 418a.

In this example, at 528, edge governor 416 provides audit reports from edge domain 410 to tenant 402. At 530, cloud governor 456 provides audit reports from cloud domain 450 to tenant 402. Alternatively, one of the governors (e.g., 416 or 456) may be designated as an aggregator or a separate aggregator may be provided to collect audit reports from the governors in the multiple domains of the secure connected compute fabric and send the aggregated audit reports to the tenant. Audit reports may be sent to tenant 402 anytime during the workload execution or at the end of the workload execution. Tenant 402 can verify the secure execution through the audit report(s) and if needed, can make adjustments to the trusted node clusters in one or more of the multiple domains. For example, interactions similar to 502-514 may be performed to make adjustments to a particular trusted node cluster.

When tenant 402 decides to remove or delete the workload from trusted node clusters 418a and 458a in the secure connected compute fabric, at 532, the tenant sends a request to security manager 412 to initiate the workload removal with orchestrator 414. At 534, security manager 412 sends a request to edge orchestrator 414 to delete the workload and resources allocations of trusted edge node cluster 418a. At 536, edge orchestrator 414 may send a request to cloud orchestrator 454 to delete the workload and resource allocations of trusted cloud node cluster 458a.

Upon receiving the request for workload deletion, trusted node clusters 418a and 458a can decommission all workload associated resources. For example, edge cluster key may be deleted, cloud CC may be deleted, and memory and storage for the workload related assets may be cleared, such as secret key, scrap the memory/storage for the workload related assets. Optionally governors 416 and 456 can monitor the execution of the decommissioning in their respective domains.

In the interactions of flow diagrams 500A-500B, tenant 402 only communicates with the initiating compute domain, edge domain 410. In this example, cloud orchestrator 454 and cloud security manager 452 convey results of resource assignment and resource attestation to the edge orchestrator 414 and edge security manager 412, respectively. Edge domain 410 is responsible for splitting up the workload between edge node cluster 418a and cloud node cluster 458a.

In another example, however, tenant 402 may communicate with both the initiating compute domain (e.g., edge domain 410) and the supporting compute domain (e.g., 450). For example, tenant 402 could communicate with both edge orchestrator 414 and cloud orchestrator 454 and with both edge security manager 412 and cloud security manager 452. Thus, tenant 402 could receive resource assignment information from each orchestrator 414 and 454 regarding respective compute domains 410 and 450. Tenant 402 could also receive attestation reports from each security manager 412 and 452 regarding selected resources in respective compute domains 410 and 450. In this scenario, tenant may securely submit encrypted portions of the workload to each trusted node cluster 418a and 458a directly.

Figure 6A:
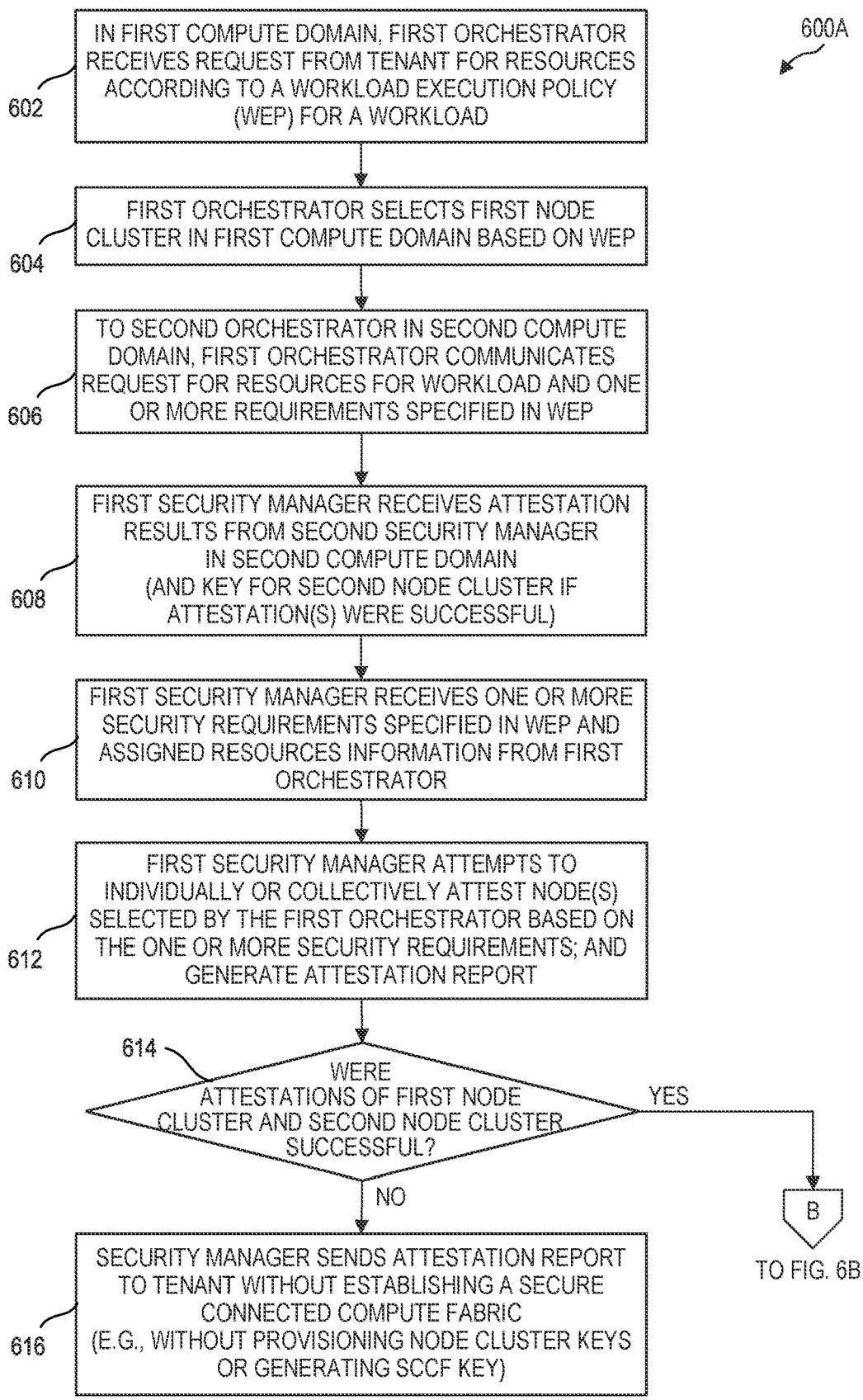
FIGS. 6A-6B are flowcharts illustrating an example process for establishing a secure connected compute fabric including a trusted group of compute nodes in a multi-domain environment according to an embodiment.
Figure 6B:
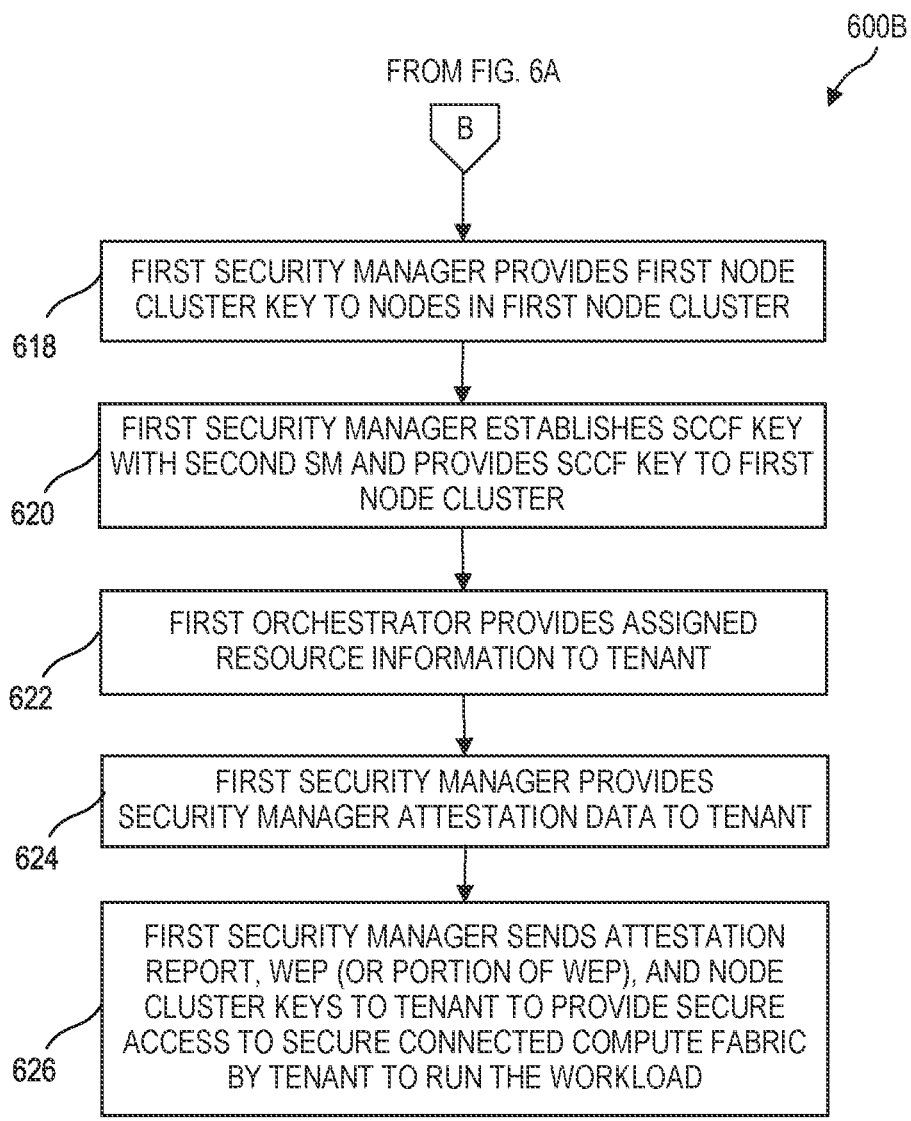

FIGS. 6A-6B are flowcharts illustrating an example process 600A-600B for establishing a trusted group of compute nodes in a multi-domain environment according to an embodiment. In an embodiment, one or more operations of process 600 may be performed, for example, in an initiating compute domain (e.g., 110 or 410) by an orchestrator (e.g., 114 or 414) and/or by a security manager (e.g., 112 or 452). As described herein, any compute domain (e.g., edge, cloud, etc.) may serve as an initiating compute domain.

In FIG. 6A, at 602, a first orchestrator of a first compute domain, which could be an edge infrastructure or a cloud infrastructure for example, receives a request from a tenant for resources to be used for a workload execution. The request for resources may specify which resources are needed for the workload and require that the resources comply with the requirements of a workload execution policy (WEP). A security manager in each compute domain in which resources are allocated for the workload, can attest the allocated resources from that domain based on one or more requirements specified in the workload execution policy. The workload execution policy may be provided by the tenant or identified by the tenant so that the policy can be obtained from storage in the first compute domain or another storage entity that is accessible to the first orchestrator.

At 604, the first orchestrator selects one or more nodes in the first compute domain to form a first node cluster. The one or more nodes may be selected based on certain requirements in the WEP, such as performance, latency, compute, regulatory, standards compliance, for example. The selected one or more nodes may be assigned to the workload, but not yet verified to comply with a security policy in the WEP. The security policy may include one or more security requirements. The selected nodes may include at least one compute node and may potentially include other types of nodes (e.g., storage, networking, memory, etc.).

At 606, the first orchestrator communicates a request to a second orchestrator in a second compute domain for one or more of the resources requested by the tenant. For example, if the first compute domain cannot provide all of the resources requested by the tenant, or if resources from other domains are to be requested by design (e.g., tenant request for particular domains to allocate particular resources, resource allocation criteria of the edge domain), the first orchestrator may request the orchestrator of the second compute domain to provide at least some of the resources for the workload. The second compute domain could be an edge infrastructure or a cloud infrastructure, for example.

The first orchestrator also communicates one or more requirements specified in the WEP to the second orchestrator. The one or more requirements can be communicated from the first orchestrator to the second orchestrator in a trust manifest, in the trust manifest and other information separate from the trust manifest, or in the WEP itself. The one or more requirements can include at least one security requirement to be used by the security manager of the second domain to attest resources selected and assigned by the second orchestrator. The one or more requirements can also include at least one other requirement to be used by the second orchestrator to select and assign resources requested by the first orchestrator.

At 608, the first security manager receives attestation results from the second security manager for a second node cluster or for the individual nodes of the second node cluster, which were selected by the second orchestrator in response to the request for resources from the first orchestrator at 606.

A description of possible processing that may occur in the second compute domain to generate the attestation results is now briefly described. In response to the request for resources provided by the first orchestrator to the second orchestrator, the second orchestrator can select one or more nodes corresponding to resources requested by first orchestrator. The one or more nodes may be selected based on the at least one other requirement of the one or more requirements specified in the WEP that were communicated by the first orchestrator to the second orchestrator. The selected nodes may include at least one compute node. The second security manager can receive the at least one security requirement (e.g., in a trust manifest) from the second orchestrator along with the list of resources that have been assigned to this workload. The second security manager may obtain attestation data from each of the nodes and evaluate the attestation data based on the security requirement(s). In one embodiment, the second security manager attempts to attest each of the nodes in the second node cluster individually. For a node to be attested, the attestation data obtained for the node is determined to indicate that the node meets (e.g., complies with, satisfies, etc.) the relevant requirement(s) of the trust manifest (or the WEP). In another embodiment, the second security manager attempts to attest the nodes collectively as the second node cluster. For a node cluster to be attested, the attestation data obtained for the node cluster is determined to indicate that the nodes collectively, as a node cluster, meet (e.g., comply with, satisfy, etc.) the relevant requirement(s) of the trust manifest (or the WEP). In at least one embodiment, the relevant requirements in the trust manifest for attesting the nodes or clusters relate to security policies for the assigned resources.

If individual attestation is performed, attestation results may include, for example, which nodes in the second node cluster are attested by the second security manager (attestation success) and which nodes in the second node cluster are not attested by the second security manager (attestation failure). If collective attestation is performed, attestation results may simply specify whether attestation of the node cluster was a success or a failure. If the resources (nodes or node cluster) in the second domain meet the relevant requirements, then the second security manager may provide a node second node cluster key to the nodes of the second node cluster to enable secure communications between the nodes.

With reference again to FIG. 6, at 610, a first security manager receives one or more security requirements specified in the WEP from the first orchestrator. In one example, the first security manager may receive the same one or more requirements that are communicated to the second orchestrator by the first orchestrator at 606 (e.g., a trust manifest or the WEP). In another example, the one or more security requirements received by the first security manager may be specific to resources assigned in the first domain (e.g., in a trust manifest for the first domain). Generally, any relevant one or more requirements specified in the WEP that are to be used to attest the assigned nodes in the first domain, all of the requirements specified in the WEP, and/or the WEP itself, may be communicated to the first security manager based on particular needs and implementations. Additionally, first security manager also receives, from the first orchestrator, information pertaining to resources assigned to the workload by the first orchestrator. By way of example, such information for a compute node could include a unique identifier of the compute node within the initiating compute domain and optionally, at least some metadata related to the compute node.

At 612, in one embodiment, the first security manager attempts to individually or collectively attest the node(s) in the first node cluster selected by the first orchestrator. The first security manager may obtain attestation data from each of the nodes in the first node cluster and evaluate the attestation data based on the one or more security requirements. For a node to be individually attested, the attestation data obtained for the node is determined to indicate that the node meets (e.g., complies with, satisfies, etc.) the one or more security requirements. For the node(s) to be collectively attested (as a node cluster), the attestation data obtained for the nodes is determined to indicate that the nodes collectively, as a node cluster, meet (e.g., comply with, satisfy, etc.) the one or more security requirements.

If individual attestation is performed, the first security node may generate an attestation report that includes, for example, which nodes in the first node cluster are attested by the first security manager (attestation success) and which nodes in the first node cluster are not successfully attested (attestation failure) by the first security manager. If collective attestation is performed, the attestation report may simply specify whether attestation of the first node cluster was a success or a failure. The attestation results of the from the second security manager are also included in the attestation report.

At 614, a determination is made by the first security manager whether the attestations of the individual nodes in the first and second node clusters by the first and second security managers were successful. Alternatively, the first security manager may determine whether the attestation of the first node cluster by the first security manager and the attestation of the second node cluster by the second security manager were successful. If any of the attestations were not successful, additional compute domains may be found (e.g., via broadcast by the first orchestrator) and a request may be sent to a third orchestrator in a third compute domain for the outstanding resources that have not been allocated because they were not available on the other compute domains or because the selected resources were not attested according to the relevant WEP requirements. Similar processing may occur in a third compute domain as described with reference to the second compute domain, and new attestation results for the nodes in a third node cluster of the third compute domain (or a new attestation result for the third node cluster in the third compute domain) can be communicated from a third security manager in the third compute domain to the first security manager in the first compute domain. This may continue for any suitable length of time based on some threshold of time until all of the resources are assigned and attested. Any other suitable threshold may be used alternatively or additionally to provide a limit to finding resources for the workload. For example, another limit may include a threshold number of supporting compute domains that may be contacted to request resources for the workload.

Once a determination is made that the requested resources are not available for the workload and that no additional compute domains will be contacted by the first compute node, then at 616, the first security manager sends the attestation report to the tenant without establishing a secure connected compute fabric. Specifically, a secure connected compute fabric (SCCF) key that would enable secure communications between the first node cluster and the second node cluster (or other node clusters in different compute domains) is not established by the first and second security managers. Additionally, a first node cluster key may not be provided to the first node cluster by the first security manager.

If the attestations of the nodes in the first node cluster and the nodes in the second node cluster were successful, then in FIG. 6B at 618, the first security manager can provide a first node cluster key to the nodes in the first node cluster. The first node cluster key can enable communications among the nodes in the first node cluster and communications between the tenant and the first node cluster to be cryptographically secured.

The first security manager may generate the first node cluster key using a cryptographic key generator or any other suitable random or deterministic data generator. In other examples, the key may be provided by a secure separate entity or area of memory accessible to the first security manager. Generally, the first node cluster key may be obtained using any suitable means for obtaining a unique and secure (e.g., secret) string of characters.

At 620, the first security manager establishes a secure connected compute fabric (SCCF) key with the second security manager. The SCCF key enables communications between the first node cluster and the second node cluster to be cryptographically secured. The first security manager can provide the SCCF key to the nodes in the first node cluster, and the second security manager can provide the SCCF key to the nodes in the second node cluster. In other implementations, one of the security managers can provide the SCCF key to the nodes in the node cluster of that security manager's compute domain, and one of the nodes that received the key can then provide the SCCF key to the nodes in the other node cluster of the other compute domain.

At 622, once the node clusters have received respective node cluster keys and the SCCF key, the first orchestrator can provide information to the tenant regarding the assigned resources for the workload.

At 624, the first security manager provides security manager attestation data to the tenant. If the tenant does not verify the security manager attestation data, then the node cluster keys are not provided to the tenant and consequently, the nodes in the node clusters are not provisioned for the workload. As previously described herein, in other embodiments, the first security manager may provide its attestation data to the tenant prior to attempting to attest assigned resources in the first domain. In other embodiments, the first security manager may provide its attestation data to the tenant prior to the first orchestrator selecting and assigning resources for the workload and/or prior to the first orchestrator requesting resources for the workload from other domains. In each embodiment, if the attestation data is not verified by the tenant, and thus the first security node is not attested, then resources are not provisioned for the workload by the first domain.

If the tenant verifies the security manager attestation data (either at 624 or previously in the flow), then at 626, the first security manager provides the attestation report, the WEP or portion thereof (or trust manifest), and the node cluster keys. The node cluster keys enable the tenant to cryptographically secure the workload. The cryptographically secured workload (or cryptographically secured workload portions) can be provided to the trusted group of node clusters in the secure connected compute fabric for execution. Thus, the first security manager provides the tenant with access to the secure connected compute fabric to run the workload.

Figure 7:
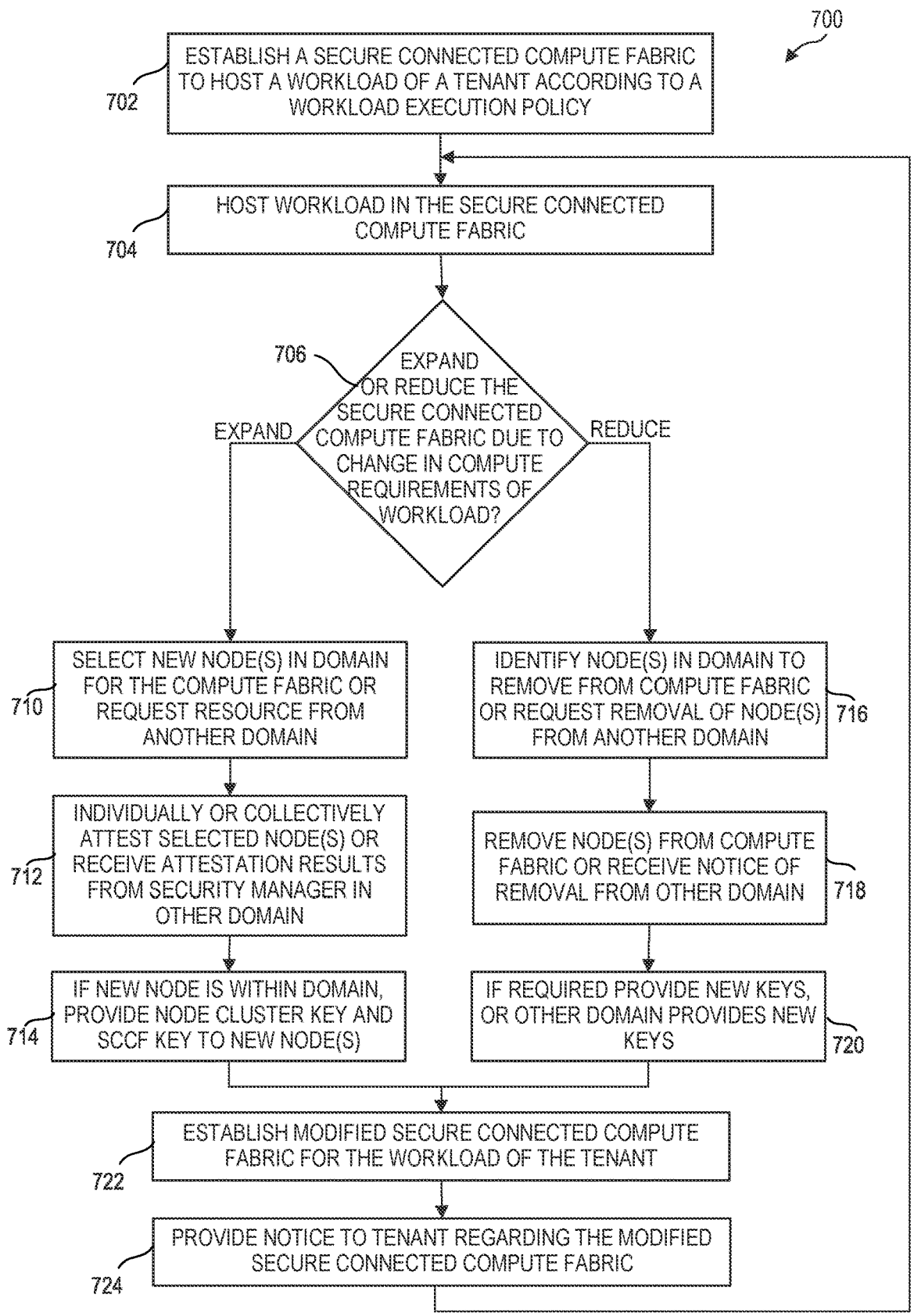
FIG. 7 is a flowchart illustrating an example process for dynamically modifying a secure connected compute fabric in a multi-domain environment according to an embodiment.

FIG. 7 is a flowchart illustrating an example process 700 for dynamically modifying a secure connected compute fabric established to host a workload of a tenant in a multi-domain environment according to an embodiment. In an embodiment, one or more operations of process 700 may be performed, for example, in an initiating compute domain (e.g., 110 or 410) by an orchestrator (e.g., 114 or 414) and/or by a security manager (e.g., 112 or 452), and/or in a supporting compute domain (e.g., 150, 450) by an orchestrator (e.g., 114 or 154) and/or by a security manager (e.g., 112 or 152). As described herein, any compute domain (e.g., edge, cloud, etc.) may serve as an initiating compute domain and any compute domain (e.g., edge, cloud, etc.) may serve as a supporting compute domain.

At 702, a secure connected compute fabric (e.g., 132, 400) may be established and may include a trusted group of node clusters (e.g., 130, 430) across multiple domains (e.g., 110, 150, 410, 450). The node cluster may include compute nodes (e.g., processing devices, accelerators, or both) and possibly storage nodes, network nodes, memory nodes or any other node suitable for inclusion in a node cluster to host a workload, or any suitable combination thereof. In one or more embodiments, the nodes in the node cluster were selected and attested according to one or more requirements in a workload execution policy for the workload. In one example, the secure connected compute fabric may have been established in process 600 of FIG. 6 or a similar process.

At 704, the secure connected compute fabric hosts the workload of the tenant. Specifically, the workload may be hosted across a trusted group of node clusters across multiple domains.

During the lifespan of the workload in the secure connected compute fabric, the compute needs may change. Example changes could include more or less processing capabilities, more or less storage availability, or different types of processing capabilities. At 706, the workload may be monitored until a sufficient change in compute requirements for the workload is detected. A determination is made as to whether the secure connected compute fabric should be expanded or reduced.

If the compute fabric is to be expanded, then at 710, if the initiating compute domain has the needed resources available, then one or more new nodes may be selected in the initiating compute domain according to the workload execution policy. At 712, the selected node(s) may be attested by the security manager. At 714, upon successful attestation, the security manager is to provide the new node(s) with the appropriate node cluster key and SCCF key for communications between trusted node clusters in different domains.

At 710, if the initiating compute domain does not have the needed resources, then a request may be sent to another domain for the resources. At 712, the security manager in the initiating compute domain receives attestation results from the security manager in the other domain. The security manager in the other domain can individually or collectively attest the new node(s) and, if the attestation is successful, provide the appropriate node cluster key and SCCF key to the new node(s) in that domain.

If the compute fabric is to be reduced, then at 716, the orchestrator in the initiating compute domain attempts to identify a node(s) for removal in that domain, while staying compliant with the workload execution policy. If a node(s) is identified in the initiating compute domain according to the workload execution policy (e.g., any minimum support required for the workload is maintained), then at 718, the node(s) is removed from the trusted node cluster in the initiating compute domain. At 720, if required, a new node cluster key and/or a new SCCF key may be generated or otherwise obtained by the security manager in the initiating compute domain, and provided to the appropriate nodes in secure connected compute fabric.

At 716, if the orchestrator in the initiating compute domain cannot identify an appropriate node to remove and to remain compliant with the workload execution policy, then a request to remove one or more nodes may be sent to another domain. At 718, the other domain may remove a node(s) from its trusted node cluster according to the workload execution policy. At 720, if required, a new node cluster key and/or a new SCCF key may be generated or otherwise obtained by the security manager in the other domain, and provided to the appropriate nodes in secure connected compute fabric.

At 722, the process may provide for establishing the modified secure connected compute fabric for the workload of the tenant. At 724, the process may further provide for providing notice to the tenant regarding the modified secure connected compute fabric. For example, the notice may include an identification of the current nodes in the secure connected compute fabric and any new node cluster keys that tenant may need to communicate with the trusted node clusters in the various domains. At 704, process 700 may continue to host the workload in the modified secure connected compute fabric.

Figure 8:
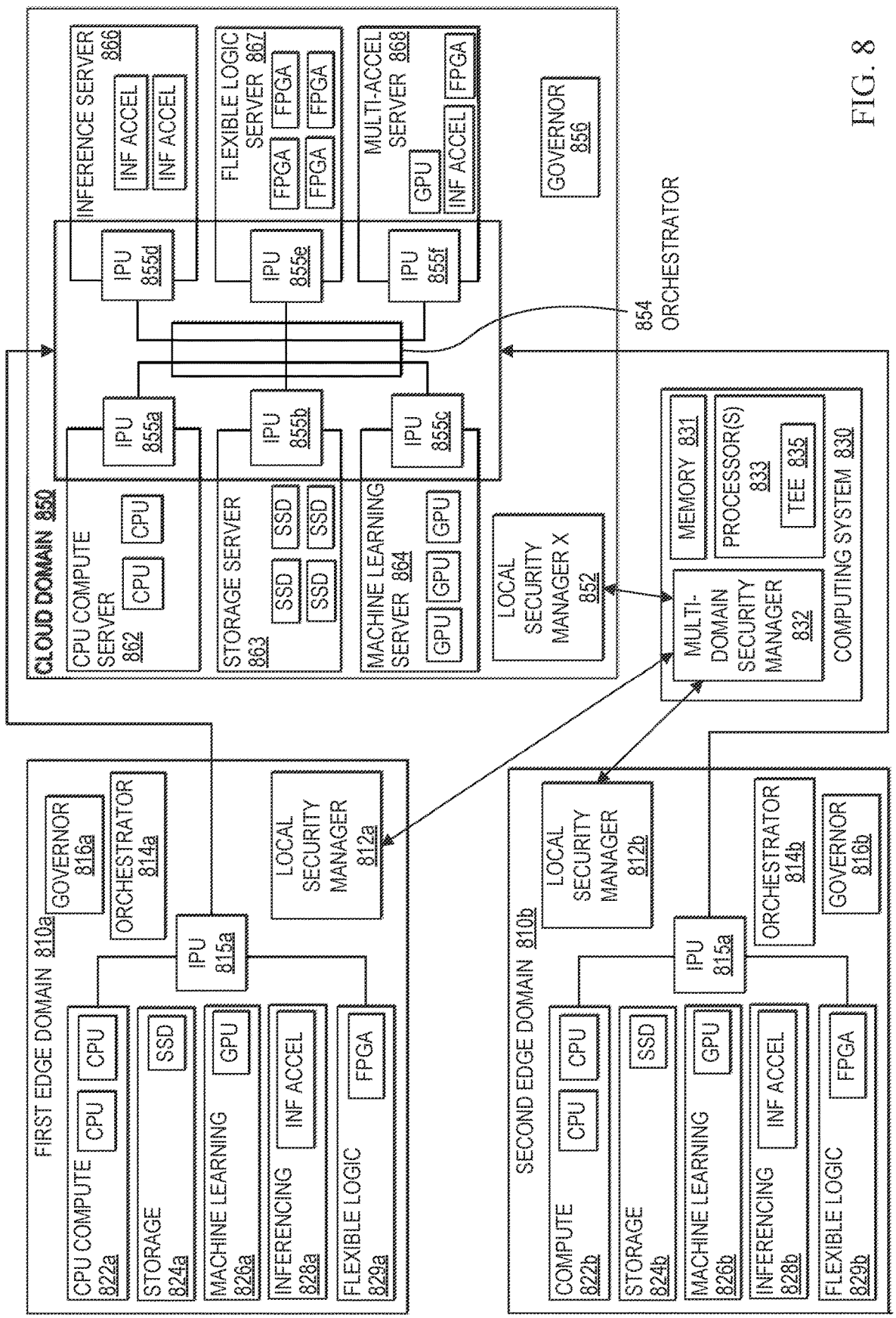
FIG. 8 is a block diagram illustrating an example multi-domain environment with another embodiment of computing systems to provide a trusted group of node clusters according to an embodiment.

FIG. 8 is a block diagram illustrating an example multi-domain environment 800 including a computing system in each domain connecting to a multi-domain security manager 834 to provide a trusted group of node clusters for a workload. Multi-domain environment 800 includes a first edge domain 810a, a second edge domain 810b, and a cloud domain 850. The edge domains represent example edge infrastructures and the cloud domain represents an example cloud infrastructure.

In the example shown in FIG. 8, edge domains 810a and 810b each include heterogeneous nodes. First edge domain 810a includes CPU compute nodes 822a (e.g., CPUs), storage nodes 824a (e.g., solid state device (SSD)), machine learning nodes 826a (e.g., GPUs), inferencing nodes 828a (e.g., inference accelerator), and flexible logic nodes 829a (e.g., FPGA). Second edge domain 810b includes CPU compute nodes 822b (e.g., CPUs), storage nodes 824b (e.g., solid state device (SSD)), machine learning nodes 826b (e.g., GPUs), inferencing nodes 828b (e.g., inference accelerator), and flexible logic nodes 829b (e.g., FPGA).

In an example, the edge domains 810a and 810b each include an infrastructure processing unit (IPU). IPUs are networking devices that may be built on smart network interface cards to offer advanced compute and network capabilities. An IPU may include a dedicated, programmable multi-core CPUs that supports infrastructure services such as management, service mesh offload, and distributed security services, etc. IPUs may also include programmable accelerators and Ethernet connectivity that accelerates and manages infrastructure functions. An IPU is capable of offloading the entire infrastructure stack from the host. IPUs may function as a control point of a host for running workloads.

Cloud domain 850 is a simplified example implementation of a computing infrastructure with disaggregated elements, including general-purpose processors, heterogeneous accelerators, storage devices, network devices, and infrastructure processing units (IPUs). In cloud domain 850, hardware components that are typically incorporated in a single compute server, are instead disaggregated from dissimilar hardware components and provided in separate servers with like hardware components.

In this example, cloud domain 850 includes a CPU compute server 862, a storage server 863, a machine learning server 864, an inference server 866, a flexible logic server 867, and a multi-accelerator server 868. Servers with processing elements contain various compute nodes such as CPUs in CPU compute server 862, GPUs in machine learning server 864, inference accelerators in inference server 866, FPGAs in flexible logic server 867, or a combination of XPUs (e.g., GPU, inference accelerator, FPGA) in multi-accelerator server 868. It should be apparent that cloud domain 850 is an example cloud infrastructure and that any other types of accelerators (e.g., VPUs, etc.) or other processing devices (e.g., special purpose ASICs, etc.) may also or alternatively be provided in a homogenous server, or in a multi-accelerator server in cloud domain 850. Additionally, other servers in the infrastructure may contain storage nodes (e.g., SSDs in storage server 863), network nodes (not shown), memory nodes (not shown), or any other type of node that can be used in a cloud infrastructure.

Each server may include an IPU 855a, 855b, 855c, 855d, 855e, or 855f that enables communication to nodes of other servers in cloud domain 850 and to orchestrator 858 in cloud domain. IPUs 855a-855f also enable communication via a network between nodes in servers 862-869 to nodes in other domains, such as first and second edge domains 810a and 810b.

In one or more embodiments of multi-domain environment 800, each domain includes an (untrusted) orchestrator 814a, 814b, or 854 and a local security manager 812a, 812b, or 852. A multi-domain security manager 832 is provided in multi-domain environment 800 to coordinate communication and key provisioning among the local security managers 812a, 812b, or 852 to establish and maintain a secure connected compute fabric with a trusted group of node clusters to host a workload, where at least one node cluster from each domain is provisioned in the trusted group.

Each domain includes an (untrusted) orchestrator 814a, 814b, or 854 and a local security manager 812a, 812b, or 852. The orchestrators 814a, 814b, and 854 may be similar to orchestrators 114 and 154 of FIGS. 1-2 and orchestrators 414, and 454 of FIG. 4. Generally, the orchestrators 814a, 814b, and 854 are responsible for resource allocation of resources requested by a tenant for a workload. Orchestrators 814a, 814b, and 854 may cooperate with each other to provide all of the resources requested by a tenant, and to provide their corresponding local security managers 812a, 812b, and 852 with appropriate policies to be used to attest the selected resources, such as compute nodes.

In at least one embodiment, any one of the orchestrators 814a, 814b, or 854 may receive a request from a tenant for resources for a workload. The receiving orchestrator can perform similar activities as previously described herein with respect to orchestrators. For example, if orchestrator 814a receives a request from a tenant for resources for a workload, then orchestrator 814a may function as an initiating compute domain. Orchestrator 814a can select resources from first edge domain 810a, create a trust manifest from a workload execution policy associated with the workload, and then send requests to other orchestrators, such as orchestrators 814b and 854, for additional resources requested by the tenant that are not being provided by first edge domain 810a. Orchestrator 814a can also provide the workload execution policy (and/or the trust manifest) to orchestrator 814*a*. Once the other orchestrators 814*b* and 854 in the other domains 810 and 850 assign resources for the workload, they may send information related to the assigned resources back to orchestrator 814*a* (as the initiating orchestrator), and the initiating orchestrator 814*a* can communicate the assigned resources information from all of the domains (e.g., 810*a*, 810*b*, and 850) to the tenant.

The local security managers 812*a*, 812*b*, and 852 can cooperate with multi-domain security manager 832 to establish a secure connected compute fabric that includes a trusted group of node clusters, where each domain provides one of the node clusters. The combination of multi-domain security manager 832 and each of the local security managers 812*a*, 812*b*, or 852 may be similar to security managers 112 and 152 of FIGS. 1-2 and security managers 412 and 452 of FIG. 4.

In at least one embodiment, local security managers 812*a*, 812*b*, and 852 can each perform individual or collective attestations of nodes that are selected by the orchestrator in their domain. A node can be individually attested by a local security manager if the local security manager determines that attestation data obtained from the node indicates that the node meets the relevant requirements of a workload execution policy associated with the workload. If all the nodes selected by an orchestrator in a domain are attested, the local security manager may generate or otherwise obtain a node cluster key and provision the nodes with the node cluster key.

In another embodiment, for node(s) to be collectively attested by a local security manager, the attestation data obtained for the nodes cluster is determined to indicate that the nodes collectively, as a node cluster, meet (e.g., comply with, satisfy, etc.) the relevant requirement(s) of the trust manifest (or the WEP). For example, an IPU, such as IPU 855*a*, that is managing a cluster of XPUs may provide attestation data for its XPU cluster (e.g., CPU compute server 862 including two CPU nodes) to the security manager. The security manager can verify the cluster's attestation data to determine whether it complies with the security policy. If the attestation data complies with the security policy than the entire cluster (e.g., CPU compute server 862) is brought into the trust boundary. If the entire cluster was assigned to the tenant by the orchestrator (e.g., orchestrator 854) then one result may indicate that the cluster does not meet the security requirements, The local security manager can send attestation results indicating the success and failure of attestation attempts for the selected nodes (or the node cluster) to the multi-domain security manager 832. The multi-domain security manager 832 can evaluate the attestation results. If attestation was successful, then multi-domain security manager 832 can generate or otherwise obtain a secure connected compute fabric (SCCF) key and provide the SCCF to each of the local security managers 812*a*, 812*b*, and 852 so that the local security managers can provide the SCCF key to the selected nodes in each domain. In other embodiments, multi-domain security manager 832 may provide the SCCF key directly to the selected nodes in each domain. In some embodiments, the multi-domain security manager 832 may also generate or otherwise obtain node cluster keys for each domain and the tenant. In this embodiment, multi-domain security manager 832 may provide the node cluster keys to the appropriate local security manager or directly to the selected nodes in the various domains. In some embodiments, node cluster keys are unique to each node cluster and enable communications among the nodes in that node cluster and communications between the tenant and the nodes in that node cluster to be cryptographically secured. In other embodiments, the same node cluster key may be used for each node cluster within the secure connected compute fabric for a particular workload.

In one or more embodiments, multi-domain security manager 832 can generate an attestation report based on the attestation results from local security managers 812*a*, 812*b*, and 852. Either the multi-domain security manager 832 or the local security manager in the initiating compute domain can attest itself to the tenant, and then provide the tenant with the attestation report, node cluster keys for each of the domains, and the workload execution policy (or trust manifest). Depending on which security manager communicates with tenant, the attestation report and the node cluster keys need to be shared with the communicating security manager.

In one or more implementations, multi-domain security manager 832 may be provided in computing system 830 that is external to the domains it services, such as compute domains 810*a*, 810*b*, and 850. In other implementations, computing system 830 may be included in one of the domains. Although multi-domain security manager 832 is illustrated in FIG. 8 as servicing two edge domains and one cloud domain, it should be apparent that an external multi-domain security manager 832 could also be implemented in a multi-edge environment (without a cloud domain) or a multi-cloud environment (without an edge domain).

Computing system 830 may include one or more processors 833, which may include one or more cores and may be embodied as any suitable processing device(s) (e.g., CPUs, GPUs, FPGAs, etc.). The one or more processors 833 may embody a compute entity (e.g., computing system or device) dedicated to running multi-domain security manager 832. Alternatively, other applications, microservices, etc. may be collocated with multi-domain security manager 832. Processors 833 may include one or more Trusted Execution Environments (TEEs) 835 to support operations of multi-domain security manager 832 including the generation of shared secret keys for node clusters (and possibly tenants), and other secure operations such as provisioning the keys to the node clusters (and possibly tenants). TEEs 835 may include, but are not necessarily limited to, Software Guard Extensions (SGX) technology by Intel Corp., technology under the name or trademark of TrustZone by ARM, Ltd., technology under the name or trademark of SEV by Advanced Micro Devices, Inc., or a trusted virtual machine. Computing system 830 may also include at least one memory 811 for storing data, at least some of which may be related to attesting assigned resources and/or establishing a trusted and connected group of node clusters based on the assigned and attested resources.

A multi-domain security manager that is external to the domains it services may provide several advantages. For example, in a multi-cloud environment, workloads may be run across multiple clouds for various reasons such as redundancy for higher Quality of assurance (QOS) if one cloud goes down, or for better security. These clouds could belong to the same cloud service provider or different cloud service providers. In this scenario, an independent security manager, such as multi-domain security manager 832, could communicate with the local security managers in each cloud to enforce consistent security policies in all of the node clusters (across multiple domains) that are hosting the workload.

Figure 9:
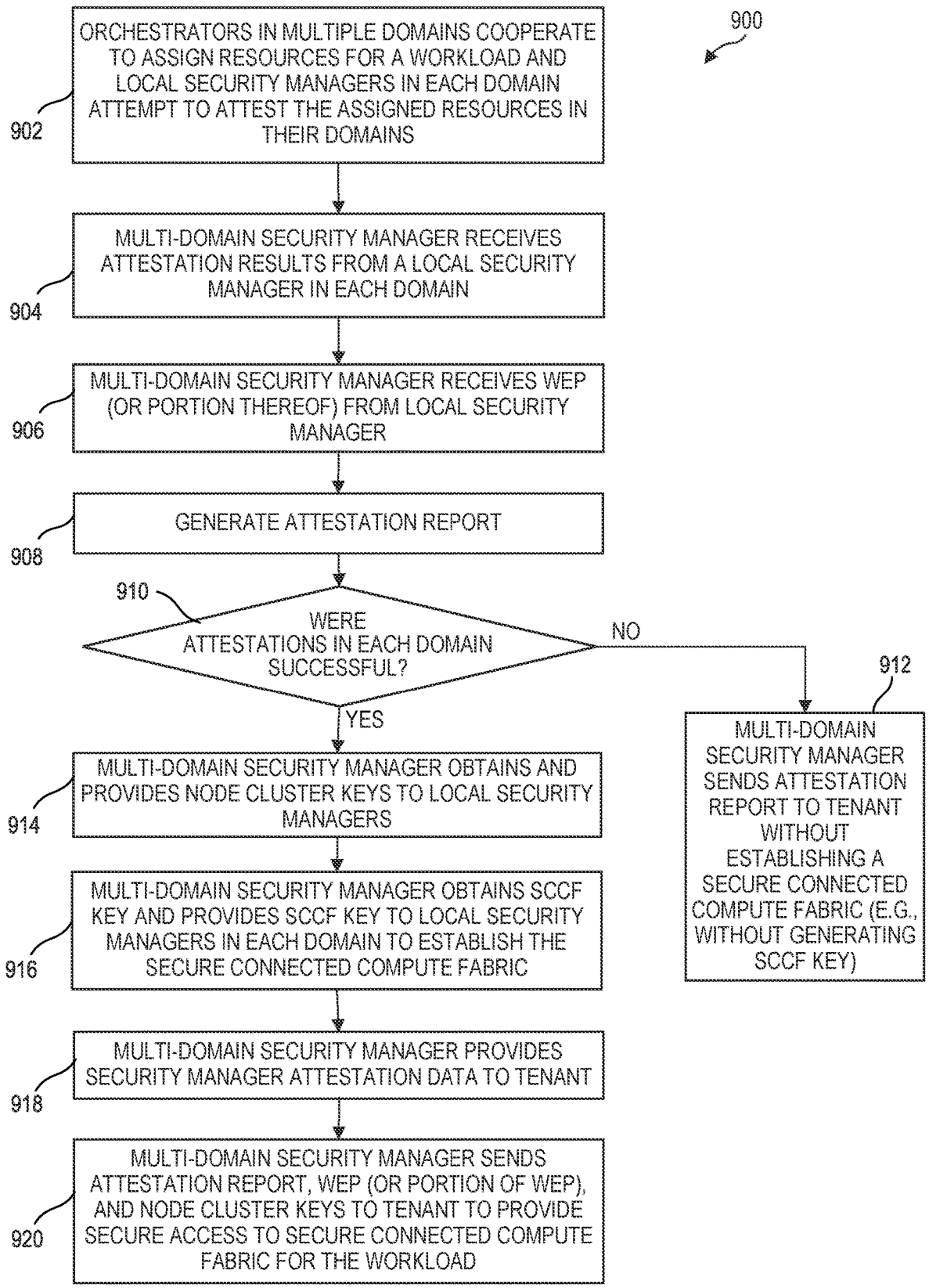
FIG. 9 is a flowchart illustrating another example process for establishing a secure connected compute fabric including a trusted group of compute nodes in a multi-domain environment according to an embodiment.

FIG. 9 is a flowchart illustrating an example process 900 for establishing a trusted group of compute zones in a multi-domain environment according to an embodiment. In an embodiment, generally one or more operations of process 900 may be performed by a multi-domain security manager (e.g., 832) in a multi-domain environment (e.g., 800). Some operations of process 900 be performed by local security managers (e.g., 812a, 812b, 852) of orchestrators (e.g., 814a, 814b, 854) in respective compute domains (e.g., 810a, 810b, 850) that the multi-domain security manager is servicing.

At 902, orchestrators in multiple domains cooperate to assign resources for a workload of a tenant. Local security managers in each of the domains may attempt to attest the assigned resources in their respective domains.

At 904, a multi-domain security manager receives attestation results from a local security manager in each domain. The attestation results may indicate which individual resources (e.g., compute nodes, storage nodes, etc.) were successfully attested and which individual resources were not successfully attested (or failed). In other embodiments, the attestation results can indicate which collective resources (e.g., node cluster) were successfully attested and which collective resources were not successfully attested (or failed).

At 908, the multi-domain security manager may generate an attestation report.

At 910, a determination can be made by the multi-domain security manager as to whether the attestations of nodes in the selected node clusters of each domain were successful. If some of the nodes failed attestation, then at 912, the multi-domain security manager can send the attestation report to the tenant without establishing a secure connected compute fabric with the node clusters in the multiple domains. For example, the multi-domain security manager may refrain from generating or otherwise obtaining an SCCF key to enable secure communications between nodes in different domains. In addition, if the multi-domain security manager is tasked with generating or otherwise obtaining the node cluster keys, rather than the local security managers, then the multi-domain security manager can refrain from generating or obtaining the node cluster keys.

If all of the selected nodes in the multiple domains were successfully attested, then at 914, if the multi-domain security manager is tasked with providing node cluster keys, then node cluster keys are generated or obtained for each domain. In other embodiments, the same node cluster key may be used for each domain. The multi-domain security manager may generate the node cluster key(s) using a cryptographic key generator or any other suitable random or deterministic data generator. The node cluster keys may then be provided to the appropriate local security managers to be distributed to the trusted node clusters.

At 916, the multi-domain security manager generates or otherwise obtains an SCCF key and provides the SCCF key to a local security manager in each domain to be distributed to the trusted node clusters. By distributing the SCCF keys, the secure connected compute fabric is established. The multi-domain security manager may generate the node cluster key(s) using a cryptographic key generator or any other suitable random or deterministic data generator.

At 918, the multi-domain security manager provides attestation data to the tenant. If the tenant verifies the attestation data, then at 920, the multi-domain security manager provides the attestation report, the WEP or portion thereof (or trust manifest), and the node cluster keys. The node cluster keys enable the tenant to cryptographically secure the workload before providing it to the secure connected compute fabric for execution. Thus, the multi-domain security manager may provide the tenant with access to the secure connected compute fabric to run the workload.

In other embodiments, a local security manager may attest itself to the tenant and provide the various information need to enable access to the secure connected compute fabric.

Figure 10:
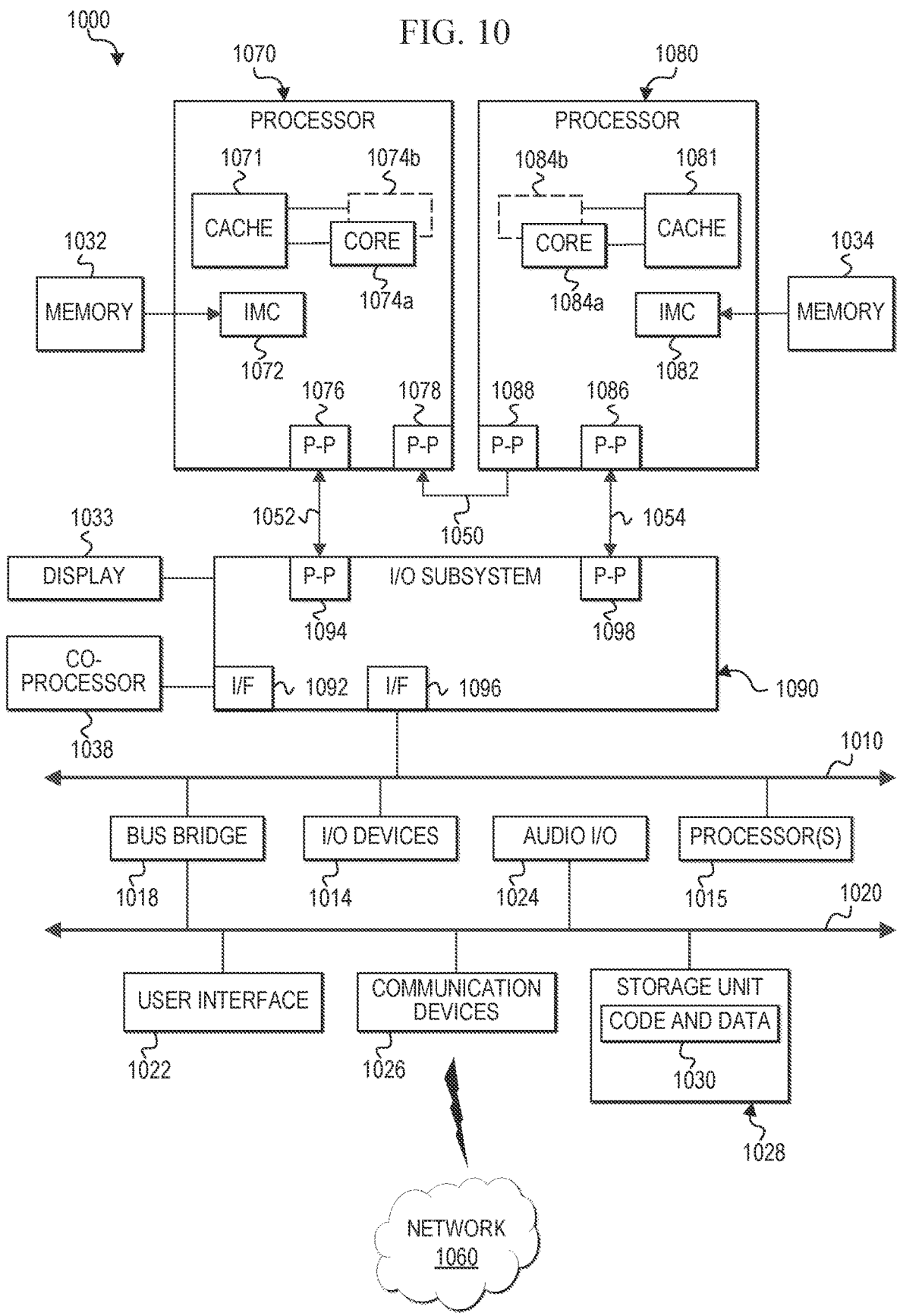
FIG. 10 is a block diagram of an example computer architecture according to at least one embodiment.

FIG. 10 illustrates a computing system 1000 that is arranged in a point-to-point (PtP) configuration according to an embodiment. In particular, FIG. 10 shows a system where processors, memory, and input/output devices are interconnected by a number of point-to-point interfaces. Generally, one or more of the compute entities, computing systems, or computing devices described herein may be configured in the same or similar manner as computing system 1000 with appropriate hardware, firmware, and/or software to implement a system to establish a secure connected compute fabric with a trusted group of node clusters in a multi-domain environment, as disclosed herein. For example, compute entities that include processor(s) 213, 253, 833, memory 211, 251, 831, orchestrators 114, 154, 414, 454, 814a, 814b, 854, security managers 112, 152, 412, 452, 812a, 812b, 852, 832, and/or governors 116, 156, 416, 456, 816a, 816b, 856, may be configured in the same or similar manner as computing system 1000.

Processors 1070 and 1080 may be implemented as single core processors 1074a and 1084a or multi-core processors 1074a-1074b and 1084a-1084b. Processors 1070 and 1080 may each include a cache 1071 and 1081 used by their respective core or cores. A shared cache (not shown) may be included in either processors or outside of both processors, yet connected with the processors via P-P interconnect, such that either or both processors' local cache information may be stored in the shared cache if a processor is placed into a low power mode. It should be noted that one or more embodiments described herein could be implemented in a computing system, such as computing system 1000. Moreover, processors 1070 and 1080 are examples of the types of hardware that can be used in connection with the implementations shown and described herein (e.g., processor 140).

Processors 1070 and 1080 may also each include integrated memory controller logic (MC) 1072 and 1082 to communicate with memory elements 1032 and 1034, which may be portions of main memory locally attached to the respective processors. In alternative embodiments, memory controller logic 1072 and 1082 may be discrete logic separate from processors 1070 and 1080. Memory elements 1032 and/or 1034 may store various data to be used by processors 1070 and 1080 in achieving operations and functionality outlined herein.

Processors 1070 and 1080 may be any type of processor, such as those discussed in connection with other figures. Processors 1070 and 1080 may exchange data via a point-to-point (PtP) interface 1050 using point-to-point interface circuits 1078 and 1088, respectively. Processors 1070 and 1080 may each exchange data with an input/output (I/O) subsystem 1090 via individual point-to-point interfaces 1052 and 1054 using point-to-point interface circuits 1076, 1086, 1094, and 1098. I/O subsystem 1090 may also exchange data with a high-performance graphics circuit 1038 via a high-performance graphics interface 1039, using an interface circuit 1092, which could be a PtP interface circuit. In one embodiment, the high-performance graphics circuit 1038 is a special-purpose processor, such as, for example, a high-throughput MIC processor, a network or communication processor, compression engine, graphics processor, GPGPU, embedded processor, or the like. I/O subsystem 1090 may also communicate with a display 1033 for displaying data that is viewable by a human user. In alternative embodiments, any or all of the PtP links illustrated in FIG. 10 could be implemented as a multi-drop bus rather than a PtP link.

I/O subsystem 1090 may be in communication with a bus 1010 via an interface circuit 1096. Bus 1010 may have one or more devices that communicate over it, such as a bus bridge 1018, I/O devices 1014, and one or more other processors 1015. Via a bus 1020, bus bridge 1018 may be in communication with other devices such as a user interface 1022 (such as a keyboard, mouse, touchscreen, or other input devices), communication devices 1026 (such as modems, network interface devices, or other types of communication devices that may communicate through a computer network 1060), audio I/O devices 1024, and/or a data storage device 1028. Data storage device 1028 may store code and data 1030, which may be executed by processors 1070 and/or 1080. In alternative embodiments, any portions of the bus architectures could be implemented with one or more PtP links.

Program code, such as code 1030, may be applied to input instructions to perform the functions described herein and generate output information. The output information may be applied to one or more output devices, in known fashion. For purposes of this application, a processing system may be part of computing system 1000 and includes any system that has a processor, such as, for example; a digital signal processor (DSP), a microcontroller, an application specific integrated circuit (ASIC), or a microprocessor.

The program code (e.g., 1030) may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the one or more of the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMS) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the present disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

The computing system depicted in FIG. 10 is a schematic illustration of an embodiment of a computing system that may be utilized to implement various embodiments discussed herein. It will be appreciated that various components of the system depicted in FIG. 10 may be combined in a system-on-a-chip (SoC) architecture or in any other suitable configuration capable of achieving the functionality and features of examples and implementations provided herein.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

"Logic" (e.g., as found in security managers 112, 152, 412, 452, 812*a*, 812*b*, 852, orchestrators, 114, 154, 414, 454, 814*a*, 814*b*, 854, and/or governors 116, 156, 416, 456) may refer to hardware, firmware, software or any suitable combination thereof to perform one or more functions. In various embodiments, logic may include a microprocessor or other processing device or element operable to execute software instructions, discrete logic such as an application specific integrated circuit (ASIC), a programmed logic device such as a field programmable gate array (FPGA), a memory device containing instructions, combinations of logic devices (e.g., as would be found on a printed circuit board), or other suitable hardware and/or software. Logic may include one or more gates or other circuit components. In some embodiments, logic may also be fully embodied as software. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

Furthermore, use of the phrases 'to,' 'configured to,' 'capable of/to,' and/or 'operable to,' in one embodiment, refers to some apparatus, logic, hardware, and/or element designed in such a way to enable use of the apparatus, logic, hardware, and/or element in a specified manner. Note that use of to, configured to, capable of/to, or operable to, in one embodiment, refers to the latent state of an apparatus, logic, hardware, and/or element, where the apparatus, logic, hardware, and/or element is not operating but is designed in such a manner to enable use of an apparatus in a specified manner.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

As used herein, unless expressly stated to the contrary, use of the phrase 'at least one of' refers to any combination of the named items, elements, conditions, operations, claim elements, or activities. For example, 'at least one of X, Y, and Z' is intended to mean any of the following: 1) at least one X, but not Y and not Z; 2) at least one Y, but not X and not Z; 3) at least one Z, but not X and not Y; 4) at least one X and Y, but not Z; 5) at least one X and Z, but not Y; 6) at least one Y and Z, but not X; or 7) at least one X, at least one Y, and at least one Z.

Additionally, unless expressly stated to the contrary, the terms 'first', 'second', 'third', etc., are intended to distinguish the particular nouns (e.g., element, condition, module, activity, operation, claim element, etc.) they modify, but are not intended to indicate any type of order, rank, importance, temporal sequence, or hierarchy of the modified noun. For example, 'first X' and 'second X' are intended to designate two separate X elements that are not necessarily limited by any order, rank, importance, temporal sequence, or hierarchy of the two elements.

Reference throughout this specification to "one embodiment" or "an embodiment" means that a particular feature, structure, or characteristic described in connection with the embodiment is included in at least one embodiment of the present disclosure. Thus, the appearances of the phrases "one embodiment" or "an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

The following examples pertain to embodiments in accordance with this specification. The system, apparatus, method, and machine readable storage medium embodiments can include one or a combination of the following examples:

The following examples pertain to embodiments in accordance with this specification. The system, apparatus, method, and machine readable storage medium embodiments can include one or a combination of the following examples:

Example C1 provides computer readable storage media including instructions stored thereon that, when executed by one or more processors, are to cause the one or more processors to receive, in a first compute domain, a first request for resources for a workload of a tenant, select a first node cluster in the first compute domain to be provisioned for the workload, receive attestation results for a second node cluster in a second compute domain, and establish a trusted group of node clusters for the workload. The trusted group of node clusters for the workload is to include the first node cluster and the second node cluster based, at least in part, on determining that a first compute node in the first node cluster meets a first security requirement of a workload execution policy associated with the workload and on the attestation results indicating that a second compute node in the second node cluster meets a second security requirement of the workload execution policy.

Example C2 comprises the subject matter of Example C1, and to establish the trusted group of node clusters is to include obtaining a first key to be used to cryptographically secure first communications between the first compute node in the first node cluster and the second compute node in the second node cluster during execution of the workload.

Example C3 comprises the subject matter of any one of Examples C1-C2, and the instructions, when executed by the one or more processors, are to further cause the one or more processors to, prior to a security manager receiving the attestation results for the second node cluster in the second compute domain, send a second request for one or more of the resources for the workload to an orchestrator of the second compute domain.

Example C4 comprises the subject matter of Example C3, and the instructions, when executed by the one or more processors, are to further cause the one or more processors to provide, to the orchestrator of the second compute domain, the second security requirement indicated in the workload execution policy.

Example C5 comprises the subject matter of any one of Examples C1-C4, and the instructions, when executed by the one or more processors, are to further cause the one or more processors to obtain a second key to be used to cryptographically secure second communications between the tenant and one or more compute nodes in the first node cluster in the first compute domain.

Example C6 comprises the subject matter of Example C5, and the second key is to be used to cryptographically secure third communications among the one or more compute nodes in the first node cluster in the first compute domain.

Example C7 comprises the subject matter of any one of Examples C5-C6, and the second key is to be obtained in response to determining that each of the one or more compute nodes in the first node cluster meets at least one security requirement of the workload execution policy associated with the workload.

Example C8 comprises the subject matter of any one of Examples C5-C7, and the instructions, when executed by the one or more processors, are to further cause the one or more processors to receive a third key to be used to cryptographically secure fourth communications between the tenant and one or more compute nodes in the second node cluster in the second compute domain and to secure fifth communications among the one or more compute nodes in the second node cluster in the second compute domain.

Example C9 comprises the subject matter of Example C8, and the instructions, when executed by the one or more processors, are to further cause the one or more processors to provide the second key to the tenant and to the one or more compute nodes of the first node cluster in the first compute domain and to provide the third key to the tenant.

Example C10 comprises the subject matter of any one of Examples C1-C9, and the instructions, when executed by the one or more processors, are to further cause the one or more processors to provide at least a portion of the workload execution policy to the tenant, provide attestation data of a security manager to the tenant, and provide an attestation report to the tenant. The attestation report is to indicate whether attestations were successful for one or more compute nodes in the first node cluster and one or more compute nodes in the second node cluster.

Example C11 comprises the subject matter of any one of Examples C1-C10, and the first compute domain is one of a first edge infrastructure or a first cloud infrastructure, and the second compute domain is one of a second edge infrastructure or a second cloud infrastructure.

Example C12 comprises the subject matter of any one of Examples C1-C11, and the resources specified in the first request include at least one of a compute node, a storage node, a network node, a memory node, and an infrastructure processing node.

Example C13 comprises the subject matter of any one of Examples C1-C12, and the instructions, when executed by the one or more processors, are to further cause the one or more processors to collect first telemetry data related to the workload executing on the first node cluster in the first compute domain, receive second telemetry data related to the workload executing on the second node cluster in the second compute domain, and provide, to the tenant, one or more audit reports based on the first telemetry data and the second telemetry data.

Example C14 comprises the subject matter of any one of Examples C1-C13, and the instructions, when executed by the one or more processors, are to further cause the one or more processors to, in response to the workload needing an additional resource during execution and determining that the additional resource is not available in the first compute domain, send a third request to an orchestrator of the second compute domain for the additional resource.

Example C15 comprises the subject matter of Example C14, and the instructions, when executed by the one or more processors, are to further cause the one or more processors to receive second attestation results for an additional node in the second compute domain, and establish a modified trusted group of node clusters for the workload including the first node cluster and a modified second node cluster based, at least in part, on determining that the second attestation results indicate that the additional node in the second compute domain meets at least one security requirement of the workload execution policy.

Example A1 provides an apparatus comprising one or more processors and a first security manager to run in a trusted execution environment (TEE) of the one or more processors. The first security manager to run in TEE of the one or more processors is to receive identifying information associated with one or more compute nodes of a first node cluster that is selected by a first orchestrator in a first compute domain in response to a first request for resources for a workload of a tenant. The first security manager is further to receive attestation results for a second node cluster from a second security manager in a second compute domain and establish a trusted group of node clusters for the workload including the first node cluster and the second node cluster based, at least in part, on determining that a first compute node in the first node cluster meets one or more security requirements of a workload execution policy associated with the workload and on the attestation results indicating that a second compute node in the second node cluster meets the one or more security requirements.

Example A2 comprises the subject matter of Example A1, and the first security manager to run in the TEE of the one or more processors is further to obtain a first key to be used to cryptographically secure first communications between the first compute node in the first node cluster and the second compute node in the second node cluster during execution of the workload.

Example A3 comprises the subject matter of any one of Examples A1-A2, and the first orchestrator is to, prior to the first security manager receiving the attestation results for the second node cluster in the second compute domain, send a second request for one or more of the resources for the workload to a second orchestrator of the second compute domain.

Example A4 comprises the subject matter of Example A3, and the first security manager to run in the TEE of the one or more processors is further to receive at least the one or more security requirements of the workload execution policy from the first orchestrator.

Example A5 comprises the subject matter of any one of Examples A1-A4, and the first security manager to run in the TEE of the one or more processors is further to obtain a second key to be used to cryptographically secure second communications between the tenant and the one or more compute nodes in the first node cluster in the first compute domain.

Example A6 comprises the subject matter of Example A5, and the second key is to be used to cryptographically secure third communications among the one or more compute nodes in the first node cluster in the first compute domain.

Example A7 comprises the subject matter of any one of Examples A5-A6, and the second key is to be obtained in response to determining that each of the one or more compute nodes in the first node cluster meets at least one security requirement of the workload execution policy.

Example A8 comprises the subject matter of any one of Examples A5-A7, and the first security manager to run in the TEE of the one or more processors is further to receive a third key to be used to cryptographically secure fourth communications between the tenant and one or more compute nodes in the second node cluster in the second compute domain and to secure fifth communications among the one or more compute nodes in the second node cluster in the second compute domain.

Example A9 comprises the subject matter of Example A8, and the first security manager to run in the TEE of the one or more processors is further to provide the second key to the tenant and to the one or more compute nodes of the first node cluster in the first compute domain and provide the third key to the tenant.

Example A10 comprises the subject matter of any one of Examples A1-A9, and the first security manager to run in the TEE of the one or more processors is further to provide at least the one or more security requirements of the workload execution policy to the tenant, provide attestation data of the first security manager to the tenant, and provide an attestation report to the tenant, the attestation report indicating whether attestations were successful for one or more compute nodes in the first node cluster and one or more compute nodes in the second node cluster.

Example A11 comprises the subject matter of any one of Examples A1-A10, and the first compute domain is one of a first edge infrastructure or a first cloud infrastructure, and the second compute domain is one of a second edge infrastructure or a second cloud infrastructure.

Example A12 comprises the subject matter of any one of Examples A1-A11, and the resources specified in the first request include at least one of a compute node, a storage node, a network node, a memory node, and an infrastructure processing node.

Example A13 comprises the subject matter of any one of Examples A1-A12, and further comprises a monitoring engine to collect first telemetry data related to the workload executing on the first node cluster in the first compute domain, receive second telemetry data related to the workload executing on the second node cluster in the second compute domain, and provide, to the tenant, one or more audit reports based on the first telemetry data and the second telemetry data.

Example A14 comprises the subject matter of any one of Examples A1-A13, and the first security manager to run in the TEE of the one or more processors is further to, subsequent to establishing the first node cluster and the second node cluster as the trusted group of node clusters, receive second attestation results for an additional node in the second compute domain, and establish a modified trusted group of node clusters for the workload including the first node cluster and a modified second node cluster based, at least in part, on determining that the second attestation results indicate that the additional node in the second compute domain meets at least one security requirement of the workload execution policy.

Example A15 comprises the subject matter of Example A14, and the first orchestrator is further to, in response to the workload needing the additional resource during execution and determining that the additional resource is not available in the first compute domain, send a third request to a second orchestrator of the second compute domain for the additional resource.

Example M1 provides a method comprising receiving, by a first orchestrator in a first compute domain, a first request for resources for a workload of a tenant, selecting a first node cluster in the first compute domain to be provisioned for the workload, and receiving, by a first security manager in the first compute domain, first information from a second compute domain. The first information is to specify a second node cluster in the second compute domain to be provisioned for the workload. The method further comprises establishing a trusted group of node clusters for the workload including the first node cluster and the second node cluster based, at least in part, on determining that a first compute node in the first node cluster meets a first security requirement of a workload execution policy associated with the workload and on the first information indicating that a second compute node in the second node cluster meets a second security requirement of the workload execution policy.

Example M2 comprises the subject matter of Example M1, and the establishing the trusted group of node clusters further includes obtaining, by the first security manager, a first key to be used to cryptographically secure first communications between the first compute node in the first node cluster and the second compute node in the second node cluster during execution of the workload.

Example M3 comprises the subject matter of any one of Examples M1-M2, and further comprises, prior to the receiving the attestation results for the second node cluster in the second compute domain, sending a second request for one or more of the resources for the workload to a second orchestrator of the second compute domain.

Example M4 comprises the subject matter of Example M3, and further comprises providing, to the second orchestrator of the second compute domain, the second security requirement indicated in the workload execution policy.

Example M5 comprises the subject matter of any one of Examples M1-M4, and further comprises obtaining a second key to be used to cryptographically secure second communications between the tenant and one or more compute nodes in the first node cluster in the first compute domain.

Example M6 comprises the subject matter of Example M5, and the second key is to be used to cryptographically secure third communications among the one or more compute nodes in the first node cluster in the first compute domain.

Example M7 comprises the subject matter of any one of Examples M5-M6, and the second key is to be obtained in response to determining that each of the one or more compute nodes in the first node cluster meets at least one security requirement of the workload execution policy associated with the workload.

Example M8 comprises the subject matter of any one of Examples M5-M7, and further comprises receiving a third key to be used to cryptographically secure fourth communications between the tenant and one or more compute nodes in the second node cluster in the second compute domain and to secure fifth communications among the one or more compute nodes in the second node cluster in the second compute domain.

Example M9 comprises the subject matter of Example M8, and further comprises providing the second key to the tenant and to the one or more compute nodes of the first node cluster in the first compute domain and providing the third key to the tenant.

Example M10 comprises the subject matter of any one of Examples M1-M9, and further comprises providing at least a portion of the workload execution policy to the tenant, providing attestation data of the first security manager to the tenant, and providing an attestation report to the tenant, the attestation report indicating whether attestations were successful for one or more compute nodes in the first node cluster and one or more compute nodes in the second node cluster.

Example M11 comprises the subject matter of any one of Examples M1-M10, and the first compute domain is one of a first edge infrastructure or a first cloud infrastructure, and the second compute domain is one of a second edge infrastructure or a second cloud infrastructure.

Example M12 comprises the subject matter of any one of Examples M1-M11, and the resources specified in the first request include at least one of a compute node, a storage node, a network node, a memory node, and an infrastructure processing node.

Example M13 comprises the subject matter of any one of Examples M1-M12, and further comprises collecting first telemetry data related to the workload executing on the first node cluster in the first compute domain, receiving second telemetry data related to the workload executing on the second node cluster in the second compute domain, and providing, to the tenant, one or more audit reports based on the first telemetry data and the second telemetry data.

Example M14 comprises the subject matter of any one of Examples M1-M13, and further comprises, in response to the workload needing an additional resource during execution and determining that the additional resource is not available in the first compute domain, providing a third request to a second orchestrator of the second compute domain for the additional resource.

Example M15 comprises the subject matter of Example M14, and further comprises receiving second attestation results for an additional node in the second compute domain, and establishing a modified trusted group of node clusters for the workload including the first node cluster and a modified second node cluster based, at least in part, on determining that the second attestation results indicate that the additional node in the second compute domain meets at least one security requirement of the workload execution policy.

Example S1 provides a system comprising one or more processors, a first orchestrator to, a first orchestrator, and a first security manager to run in a trusted execution environment (TEE) of the one or more processors. The first orchestrator is to receive a first request for resources for a workload of a tenant and select a first node cluster in a first compute domain to be provisioned for the workload. The first security manager to run in TEE of the one or more processors is to receive attestation results for a second node cluster from a second security manager in a second compute domain and establish a trusted group of node clusters for the workload including the first node cluster and the second node cluster based, at least in part, on determining that a first compute node in the first node cluster meets a first security requirement of a workload execution policy associated with the workload and on the attestation results indicating that a second compute node in the second node cluster meets a second security requirement of the workload execution policy.

Example S2 comprises the subject matter of Example S1, and the first security manager to run in the TEE of the one or more processors is further to obtain a first key to be used to cryptographically secure first communications between the first compute node in the first node cluster and the second compute node in the second node cluster during execution of the workload.

Example S3 comprises the subject matter of any one of Examples S1-S2, and the first orchestrator is further to, prior to the first security manager receiving the attestation results for the second node cluster in the second compute domain, send a second request for one or more of the resources for the workload to a second orchestrator of the second compute domain.

Example S4 comprises the subject matter of Example S3, and the first orchestrator is further to provide, to the second orchestrator in the second domain, the second security requirement indicated in the workload execution policy.

Example S5 comprises the subject matter of any one of Examples S1-S4, and the first security manager to run in the TEE of the one or more processors is further to obtain a second key to be used to cryptographically secure second communications between the tenant and one or more compute nodes in the first node cluster in the first compute domain.

Example S6 comprises the subject matter of Example S5, and the second key is to be used to cryptographically secure third communications among the one or more compute nodes in the first node cluster in the first compute domain.

Example S7 comprises the subject matter of any one of Examples S5-S6, and the second key is to be obtained in response to determining that each of the one or more compute nodes in the first node cluster meets at least one security requirement of the workload execution policy associated with the workload.

Example S8 comprises the subject matter of any one of Examples S5-S7, and the first security manager to run in the TEE of the one or more processors is further to receive a third key to be used to cryptographically secure fourth communications between the tenant and one or more compute nodes in the second node cluster in the second compute domain and to secure fifth communications among the one or more compute nodes in the second node cluster in the second compute domain.

Example S9 comprises the subject matter of Example S8, and the first security manager to run in the TEE of the one or more processors is further to provide the second key to the tenant and to the one or more compute nodes of the first node cluster in the first compute domain and provide the third key to the tenant.

Example S10 comprises the subject matter of any one of Examples S1-S9, and the first security manager to run in the TEE of the one or more processors is further to provide at least a portion of the workload execution policy to the tenant, provide attestation data of the first security manager to the tenant, and provide an attestation report to the tenant, the attestation report indicating whether attestations were successful for one or more compute nodes in the first node cluster and one or more compute nodes in the second node cluster.

Example S11 comprises the subject matter of any one of Examples S1-S10, and the first compute domain is one of a first edge infrastructure or a first cloud infrastructure, and the second compute domain is one of a second edge infrastructure or a second cloud infrastructure.

Example S12 comprises the subject matter of any one of Examples S1-S11, and the resources specified in the first request include at least one of a compute node, a storage node, a network node, a memory node, and an infrastructure processing node.

Example S13 comprises the subject matter of any one of Examples S1-S12, and further comprises a monitoring engine to collect first telemetry data related to the workload executing on the first node cluster in the first compute domain, receive second telemetry data related to the workload executing on the second node cluster in the second compute domain, and provide, to the tenant, one or more audit reports based on the first telemetry data and the second telemetry data.

Example S14 comprises the subject matter of any one of Examples S1-S13, and the first orchestrator is further to, in response to the workload needing an additional resource during execution and determining that the additional resource is not available in the first compute domain, send a third request to a second orchestrator of the second compute domain for the additional resource.

Example S15 comprises the subject matter of Example S14, and the first security manager to run in the TEE of the one or more processors is further to receive second attestation results for the additional node in the second compute domain, and establish a modified trusted group of node clusters for the workload including the first node cluster and a modified second node cluster based, at least in part, on determining that the second attestation results indicate that the additional node in the second compute domain meets at least one security requirement of the workload execution policy.

Example SX1 provides a system or apparatus, comprising a first processor including a trusted execution environment (TEE) and a first security manager to run in the TEE to receive, from a first orchestrator in a first compute domain, one or more security requirements of a workload execution policy associated with a workload of a tenant, receive first attestation results for a first node cluster including a first compute node in the first compute domain, receive second attestation results for a second node cluster including a second compute node in a second compute domain, and establish a trusted group of node clusters for the workload. The trusted group of node clusters includes the first node cluster and the second node cluster and is established based, at least in part, on the first attestation results indicating that the first compute node meets a first security requirement of the workload execution policy and the second attestation results indicating that the second compute node meets a second security requirement of the workload execution policy.

Example SX2 comprises the subject matter of Example SX1, and the first security manager to run in the TEE is further to obtain a first key to be used to cryptographically secure first communications between the first compute node of the first node cluster and the second compute node of the second node cluster during execution of the workload and provide the first key to a first local security manager of the first compute domain and to a second local security manager of the second compute domain.

Example SX3 comprises the subject matter of any one of Examples SX1-SX2, and the first orchestrator is to receive a first request for resources for the workload of the tenant, select the first node cluster including the first compute node in the first compute domain to be provisioned for the workload, and send a second request for one or more of the resources for the workload to a second orchestrator of the second compute domain.

Example SX4 comprises the subject matter of any one of Examples SX1-SX3, and the first security manager to run in the TEE is further to obtain a second key to be used to cryptographically secure second communications between the tenant and first nodes in the first node cluster in the first compute domain, obtain a third key to be used to cryptographically secure third communications between the tenant and second nodes in the second node cluster in the second compute domain, provide the second key and the third key to the tenant, and provide an attestation report to the tenant. The attestation report is to indicate whether attestations were successful for the first nodes in the first node cluster and the second nodes in the second node cluster.

Example SX5 comprises the subject matter of Example SX4, and the first attestation results are received from a first local security manager of the first compute domain, and the second attestation results are received from a second local security manager of the second compute domain.

Example SX6 comprises the subject matter of any one of Examples SX1-SX5, and the second processor including the TEE is external to the first compute domain and the second compute domain.

Example N1 provides an apparatus comprising means for receiving, in a first compute domain, a first request for resources for a workload of a tenant, means for selecting a first node cluster in the first compute domain to be provisioned for the workload, and means for receiving, by a first security manager in the first compute domain, first information from a second compute domain. The first information specifies a second node cluster in the second compute domain to be provisioned for the workload. The apparatus further comprises means for establishing a trusted group of node clusters for the workload including the first node cluster and the second node cluster based, at least in part, on determining that a first compute node in the first node cluster meets a first security requirement of a workload execution policy associated with the workload and on the first information indicating that a second compute node in the second node cluster meets a second security requirement of the workload execution policy.

Example N2 comprises the subject matter of Example N1, and the means for establishing the trusted group of node clusters includes means for obtaining, by the first security manager, a first key to be used to cryptographically secure first communications between the first compute node in the first node cluster and the second compute node in the second node cluster during execution of the workload.

Example N3 comprises the subject matter of any one of Examples N1-N2, and the means for receiving the first information from the second compute domain includes a trusted execution environment of at least one processor.

Example Y1 provides an apparatus, the apparatus comprising means for performing the method of any one of the Examples M1-M15.

Example Y2 comprises the subject matter of Example Y1, and the means for performing the method comprises one or more processors, at least one memory element, and a trusted execution environment of at least one of the one or more processors.

Example Y3 comprises the subject matter of Example Y2, and the at least one memory element comprises machine readable instructions that when executed, cause the apparatus to perform the method of any one of Examples M1-M15.

Example Y4 comprises the subject matter of any one of Examples Y1-Y3, and the apparatus is a computing system.

Example Y5 comprises the subject matter of Example Y4, and the computing system is a system-on-a-chip.

An Example X1 provides at least one machine readable storage medium comprising instructions that, when executed, realize a system, realize an apparatus, or implement a method as in any one of Examples S1-S15, SX1-SX6, A1-A15, N1-N3, Y1-Y2, or M1-M15.

The invention claimed is:

1. One or more non-transitory computer readable storage media including instructions stored thereon that, when executed by one or more processors, are to cause the one or more processors to:
    receive, by a first orchestration element that manages a first plurality of resources in a first compute domain of a multi-domain environment, a first request for two or more resources for a workload of a tenant;
    select, based on the first request, a first node cluster from the first compute domain to be provisioned for the workload and to include a first compute node as a first resource of the two or more resources;
    send, to a second orchestration element that manages a second plurality of resources in a second compute domain in the multi-domain environment, a second request for at least a second resource of the two or more resources for the workload;
    receive attestation results for a second node cluster selected from the second compute domain by the second orchestration element based on the second request, the second node cluster to include a second compute node as the second resource;
    establish a trusted group of node clusters for the workload including the first node cluster and the second node cluster based, at least in part, on determining that the first compute node in the first node cluster meets a first security requirement of a workload execution policy associated with the workload and on the attestation results indicating that the second compute node in the second node cluster meets a second security requirement of the workload execution policy;
    obtain a first key to be used to cryptographically secure first communications between the first node cluster including at least the first compute node and the second node cluster including at least the second compute node; and
    obtain a second key to be used to cryptographically secure second communications between the tenant and one or more compute nodes in the first node cluster.

2. The one or more non-transitory computer readable storage media of claim 1, wherein the instructions, when executed by the one or more processors, are to cause the one or more processors to:
    provide, to the second orchestration element of the second compute domain, the second security requirement indicated in the workload execution policy.

3. The one or more non-transitory computer readable storage media of claim 1, wherein the second key is to be used to cryptographically secure third communications among the one or more compute nodes in the first node cluster in the first compute domain.

4. The one or more non-transitory computer readable storage media of claim 1, wherein the second key is to be obtained in response to determining that each of the one or more compute nodes in the first node cluster meets at least one security requirement of the workload execution policy associated with the workload.

5. The one or more non-transitory computer readable storage media of claim 1, wherein the instructions, when executed by the one or more processors, are to cause the one or more processors to:
    receive a third key to be used to cryptographically secure fourth communications between the tenant and one or more other compute nodes in the second node cluster in the second compute domain and to secure fifth communications among the one or more other compute nodes in the second node cluster in the second compute domain.

6. The one or more non-transitory computer readable storage media of claim 5, wherein the instructions, when executed by the one or more processors, are to cause the one or more processors to:
    provide the second key to the tenant and to the one or more compute nodes of the first node cluster in the first compute domain; and
    provide the third key to the tenant.

7. The one or more non-transitory computer readable storage media of claim 1, wherein the instructions when executed by the one or more processors are to cause the one or more processors to:
    provide an attestation report to the tenant, the attestation report indicating whether attestations were successful for the one or more compute nodes in the first node cluster and one or more other compute nodes in the second node cluster.

8. The one or more non-transitory computer readable storage media of claim 1, wherein the first compute domain is one of a first edge infrastructure or a first cloud infrastructure, and wherein the second compute domain is one of a second edge infrastructure or a second cloud infrastructure.

9. The one or more non-transitory computer readable storage media of claim 1, wherein the two or more resources specified in the first request include at least one of a compute node, a storage node, a network node, a memory node, and an infrastructure processing node.

10. The one or more non-transitory computer readable storage media of claim 1, wherein the instructions when executed by the one or more processors are to cause the one or more processors to:
    collect first telemetry data related to the workload executing on the first node cluster in the first compute domain;
    receive second telemetry data related to the workload executing on the second node cluster in the second compute domain; and
    provide, to the tenant, one or more audit reports based on the first telemetry data and the second telemetry data.

11. The one or more non-transitory computer readable storage media of claim 1, wherein the first orchestration element and a security manager that receives the attestation results for the second node cluster are either separate modules or integrated modules.

12. The one or more non-transitory computer readable storage media of claim 1, wherein the first node cluster includes a third compute node as a third resource of the two or more resources.

13. The one or more non-transitory computer readable storage media of claim 1, wherein the second node cluster includes a fourth compute node as a fourth resource of the two or more resources.

14. An apparatus comprising:
one or more processors; and
a first security manager to run in a trusted execution environment (TEE) of the one or more processors to:
receive identifying information associated with one or more compute nodes of a first node cluster selected from a first compute domain of a multi-domain environment, wherein in response to a first request for two or more resources for a workload of a tenant, the first node cluster is to be selected by a first orchestrator that manages a first plurality of resources in the first compute domain;
receive, from a second security manager in a second compute domain of the multi-domain environment, attestation results for a second node cluster selected from the second compute domain by a second orchestrator that manages a second plurality of resources in the second compute domain based on a second request for at least a second resource of the two or more resources for the workload;
establish a trusted group of node clusters for the workload including the first node cluster and the second node cluster based, at least in part, on determining that a first compute node in the first node cluster meets one or more security requirements for a first resource of the two or more resources and on the attestation results indicating that a second compute node in the second node cluster meets the one or more security requirements for the second resource, wherein the one or more security requirements are included in a workload execution policy associated with the workload;
obtain a first key to be used to cryptographically secure first communications between the first node cluster including at least the first compute node and the second node cluster including at least the second compute node; and
obtain a second key to be used to cryptographically secure second communications among the first compute node and one or more other compute nodes in the first node cluster of the first compute domain.

15. The apparatus of claim 14, wherein the first orchestrator is to:
send the second request to the second orchestrator of the second compute domain; and
provide at least the one or more security requirements of the workload execution policy to the first security manager and the second orchestrator.

16. The apparatus of claim 14, wherein the first security manager to run in the TEE of the one or more processors is further to:
provide at least the one or more security requirements of the workload execution policy to the tenant; and
provide attestation data of the first security manager to the tenant.

17. The apparatus of claim 14, wherein the first security manager to run in the TEE of the one or more processors is further to:
obtain a third key to be used to cryptographically secure third communications between the tenant and the first compute node in the first node cluster and between the tenant and the one or more other compute nodes in the first node cluster.

18. A method comprising:
receiving, by a first orchestrator that manages a first plurality of resources in a first compute domain of a multi-domain environment, a first request for two or more resources for a workload of a tenant;
selecting, based on the first request, a first node cluster in the first compute domain to be provisioned for the workload and including a first compute node as a first resource of the two or more resources;
sending a second request for at least a second resource of the two or more resources for the workload to a second orchestrator that manages a second plurality of resources in a second compute domain of the multi-domain environment;
receiving, by a first security manager in the first compute domain, first information from a second compute domain, the first information specifying a second node cluster in the second compute domain selected from the second compute domain by the second orchestrator based on the second request, wherein the second node cluster is to be provisioned for the workload;
establishing a trusted group of node clusters for the workload including the first node cluster and the second node cluster based, at least in part, on determining that the first compute node in the first node cluster meets a first security requirement for the first resource and on the first information indicating that a second compute node in the second node cluster meets a second security requirement for the second resource, wherein the first security requirement and the second security requirement are included in a workload execution policy associated with the workload;
obtaining a first key to cryptographically secure first communications between the first node cluster including at least the first compute node and the second node cluster including at least the second compute node; and
obtaining a second key to cryptographically secure second communications between the tenant and one or more compute nodes in the first node cluster in the first compute domain.

19. The method of claim 18, further comprising:
receiving a third key to be used to cryptographically secure third communications between the tenant and at least one other compute nodes in the second node cluster in the second compute domain.

20. A system comprising:
a first hardware processor including a trusted execution environment (TEE); and
a first security manager to run in the TEE to:
receive, from a first orchestrator that manages a first plurality of resources in a first compute domain of a multi-domain environment, one or more security requirements of a workload execution policy associated with a workload of a tenant;
receive first attestation results for a first node cluster selected by the first orchestrator from the first compute domain based on a first request for at least a first resource of two or more resources for the workload of the tenant, wherein the first node cluster is to include a first compute node as a first resource of the two or more resources;
receive second attestation results for a second node cluster selected by a second orchestrator that manages a second plurality of resources in a second compute domain of the multi-domain environment based on a second request for at least a second resource of the two or more resources for the workload of the tenant, wherein the second node cluster is to include a second compute node as the second resource;

establish a trusted group of node clusters for the workload, the trusted group of node clusters to include the first node cluster and the second node cluster based, at least in part, on the first attestation results indicating that the first compute node meets a first security requirement of the workload execution policy and the second attestation results indicating that the second compute node meets a second security requirement of the workload execution policy;

obtain a first key to be used to cryptographically secure first communications between the first node cluster and the second node cluster; and obtain a second key to be used to cryptographically secure second communications between the tenant and the first node cluster in the first compute domain.

21. The system of claim 20, wherein the first security manager to run in the TEE is further to:

provide the first key to a first local security manager of the first compute domain and to a second local security manager of the second compute domain.

22. The system of claim 20, wherein the first orchestrator is to:

receive the first request;

select the first node cluster including the first compute node in the first compute domain to be provisioned for the workload; and send the second request to the second orchestrator of the second compute domain.

23. The system of claim 20, wherein the first security manager to run in the TEE is further to:

obtain a third key to be used to cryptographically secure third communications between the tenant and the second node cluster in the second compute domain;

provide the second key and the third key to the tenant; and provide an attestation report to the tenant, the attestation report indicating whether attestations were successful for the first node cluster and the second node cluster.

24. The system of claim 23, wherein the first attestation results are received from a first local security manager of the first compute domain, and the second attestation results are received from a second local security manager of the second compute domain.

25. The system of claim 20, wherein the first hardware processor including the TEE is external to the first compute domain and the second compute domain.

* * * * *